(12) United States Patent
Chu

(10) Patent No.: US 12,482,484 B1
(45) Date of Patent: Nov. 25, 2025

(54) LOCATION ESTIMATION OF SOUND SOURCES

(71) Applicant: Amazon Technologies, Inc., Seattle, WA (US)

(72) Inventor: Wai Chung Chu, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 173 days.

(21) Appl. No.: 18/538,574

(22) Filed: Dec. 13, 2023

(51) Int. Cl.
*G10L 21/055* (2013.01)
*G10L 25/21* (2013.01)
*H04S 7/00* (2006.01)
*G10L 21/0216* (2013.01)

(52) U.S. Cl.
CPC ............ *G10L 21/055* (2013.01); *G10L 25/21* (2013.01); *H04S 7/302* (2013.01); *G10L 2021/02166* (2013.01)

(58) Field of Classification Search
CPC .............................................. G10L 2021/02166
See application file for complete search history.

(56) References Cited

U.S. PATENT DOCUMENTS

| | | | |
|---|---|---|---|
| 10,957,338 B2 | 3/2021 | Nesta et al. | |
| 10,986,437 B1 | 4/2021 | Pan et al. | |
| 11,264,017 B2 | 3/2022 | Masnadi-Shirazi et al. | |
| 11,638,091 B2 * | 4/2023 | McCowan | H04R 3/005 381/26 |

FOREIGN PATENT DOCUMENTS

CN 111025233 B * 9/2023 ............... G01S 5/20

OTHER PUBLICATIONS

Li, et al., "Sound Source Localization for Mobile Robot Based on Time Difference Feature and Space Grid Matching," 2011 IEEE/RSJ International Conference on Intelligent Robots and Systems, Sep. 25-30, 2011. (Year: 2011).*

Michaud, et al., "3D Localization of a Sound Source Using Mobile Microphone Arrays Referenced by SLAM," 2020 IEEE/RSJ International Conference on Intelligent Robots and Systems (IROS), Oct. 25-29, 2020. (Year: 2020).*

Joseph Hector DiBiase, "A High-Accuracy, Low-Latency Technique for Talker Localization in Reverberant Environments Using Microphone Arrays", PHD Thesis, May 2000, 122 pages. https://citeseerx.ist.psu.edu/document?repid=rep1&type=pdf&doi=4e3c7d012c9312c177b740db3dcf3838e5d78e8a.

* cited by examiner

Primary Examiner — Feng-Tzer Tzeng
(74) Attorney, Agent, or Firm — Pierce Atwood LLP

(57) ABSTRACT

A system configured to improve sound source localization (SSL) processing by including distance information. By estimating a 3D location vector corresponding to a direction and a distance associated with a sound source, the system may extend SSL processing from 2D to 3D and generate a location estimate for the sound source. In addition, the system groups the 3D location vectors into 3D location cells having a regular structure (e.g., predetermined uniformity and/or symmetry), which simplifies SSL processing and results in a substantial reduction in computational cost. For example, the system may associate each 3D location cell with (i) location vectors contained within the 3D location cell, (ii) weight values indicating a relative weight of each location vector for the 3D location cell, and (iii) neighboring 3D location cells. Using these associations, the system may identify peak power value(s) corresponding to sound source(s) and generate location estimates for each sound source.

20 Claims, 18 Drawing Sheets

FIG. 1
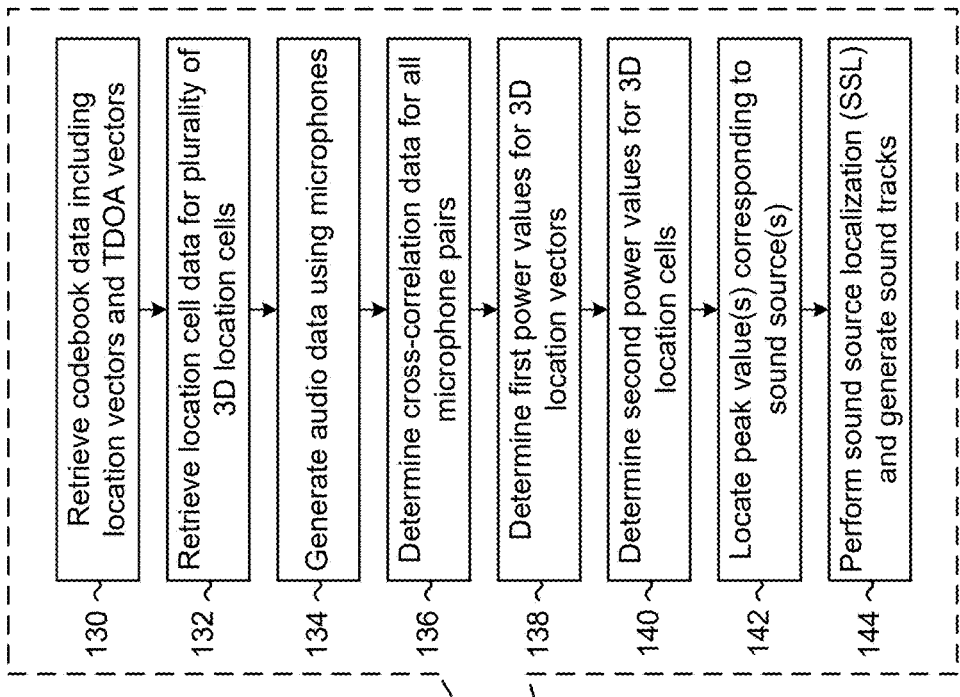
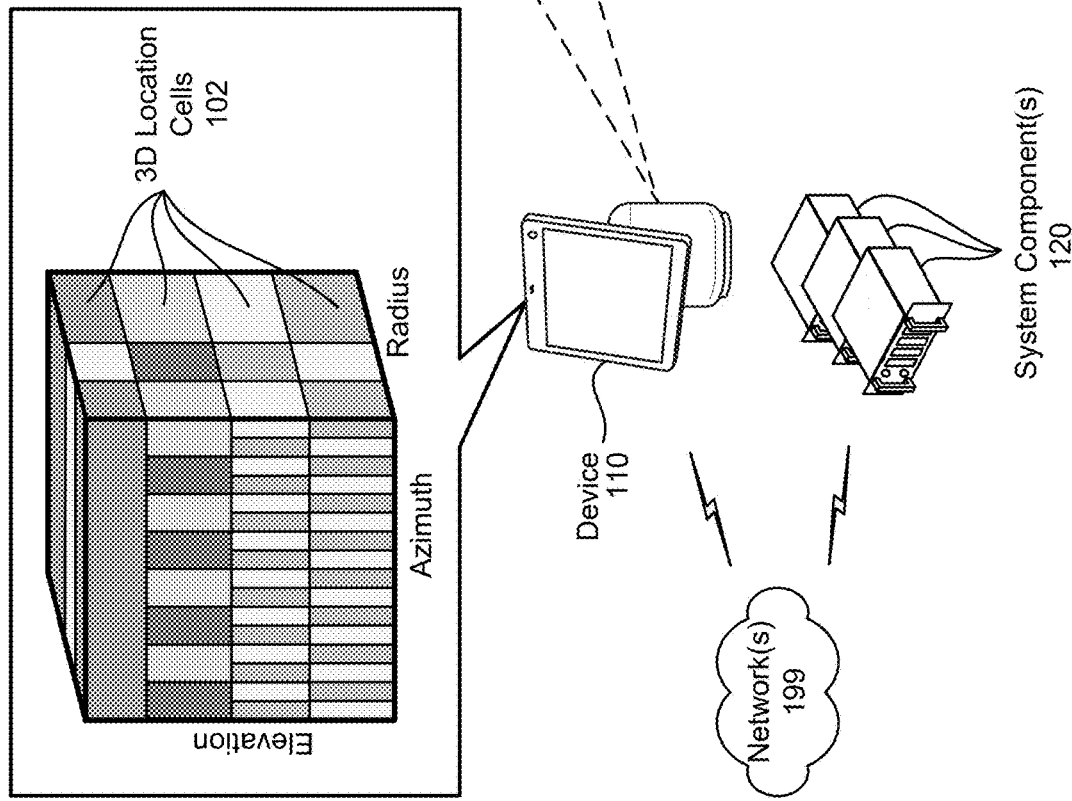

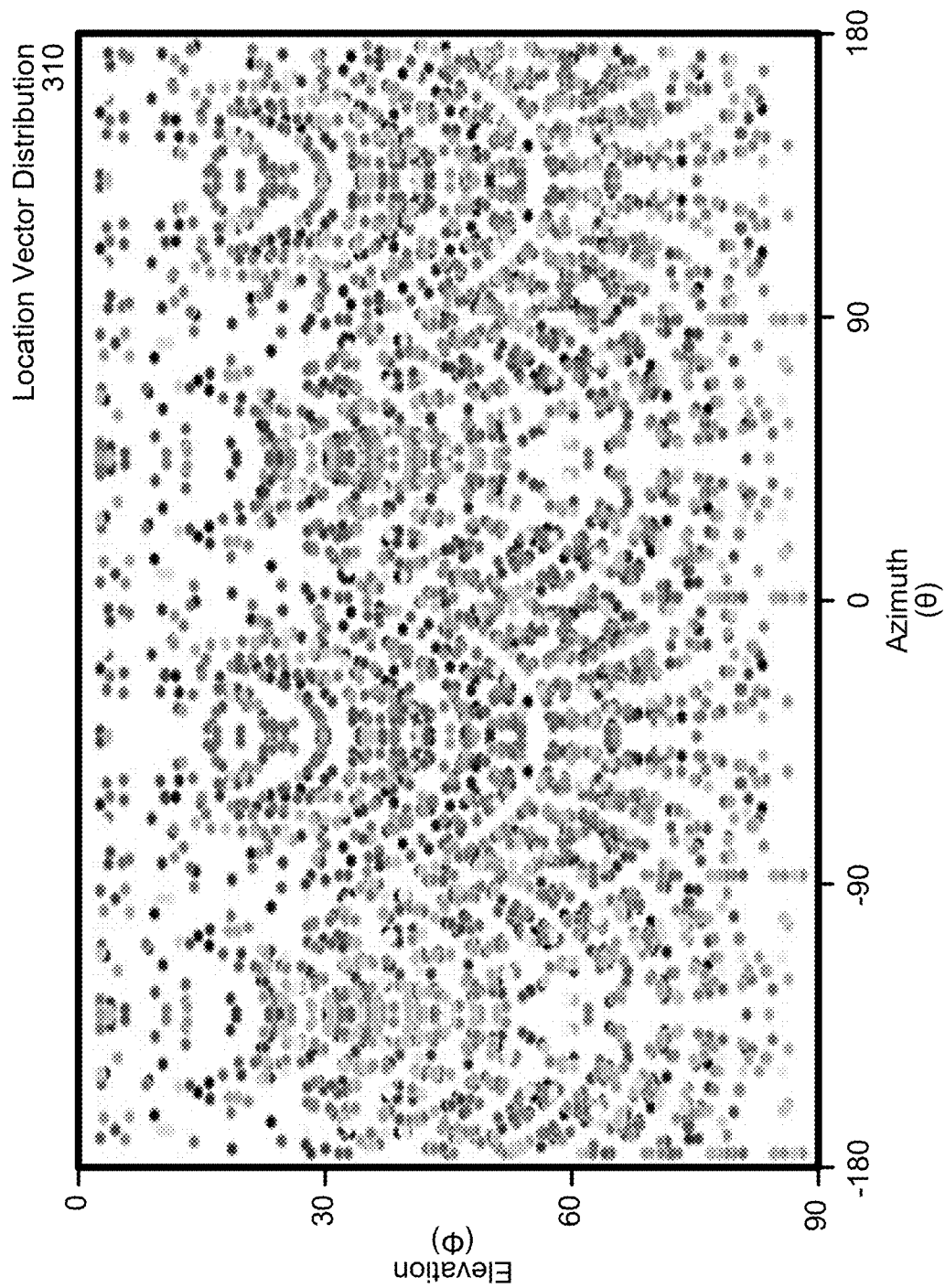

FIG. 4A
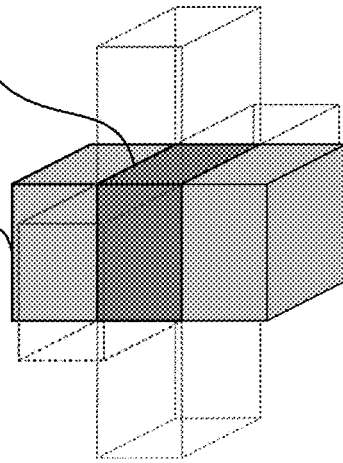
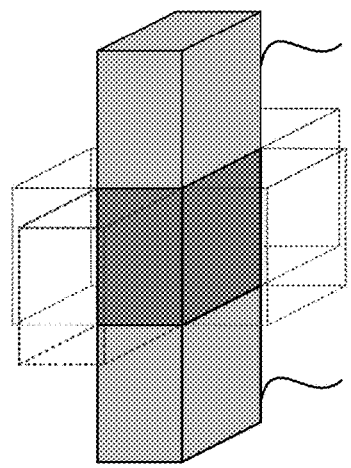
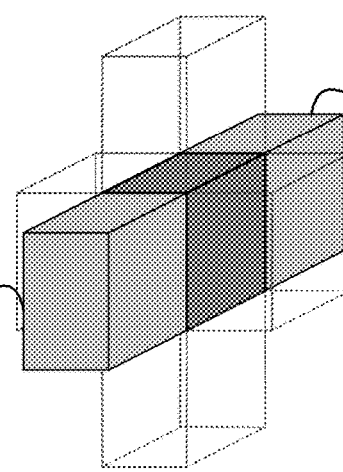

FIG. 5

Location Cell Data 510

| Location Cell | aziMin | aziMax | eleMin | eleMax | radMin | radMax | Index | Weight |
|---|---|---|---|---|---|---|---|---|
| 0 | $\theta_0$ | $\theta_1$ | $\phi_0$ | $\phi_1$ | $r_0$ | $r_1$ | $[t_{0,0}, t_{0,1}, ..., t_{0,T0}]$ | $[s_{0,0}, s_{0,1}, ..., s_{0,s0}]$ |
| 1 | $\theta_1$ | $\theta_2$ | $\phi_0$ | $\phi_1$ | $r_0$ | $r_1$ | $[t_{1,0}, t_{1,1}, ..., t_{1,T1}]$ | $[s_{1,0}, s_{1,1}, ..., s_{1,s1}]$ |
| 2 | $\theta_2$ | $\theta_3$ | $\phi_0$ | $\phi_1$ | $r_0$ | $r_1$ | $[t_{2,0}, t_{2,1}, ..., t_{2,T2}]$ | $[s_{2,0}, s_{2,1}, ..., s_{2,s2}]$ |
| ... | ... | ... | ... | ... | ... | ... | ... | ... |
| n | $\theta_{a-1}$ | $\theta_a$ | $\phi_{e-1}$ | $\phi_e$ | $r_{r-1}$ | $r_r$ | $[t_{n,0}, t_{n,1}, ..., t_{n,Tn}]$ | $[s_{n,0}, s_{n,1}, ..., s_{n,sn}]$ |
| ... | ... | ... | ... | ... | ... | ... | ... | ... |
| N-1 | $\theta_{A-1}$ | $\theta_A$ | $\phi_{E-1}$ | $\phi_E$ | $r_{R-1}$ | $r_R$ | $[t_{N-1,0}, ..., t_{N-1,TN-1}]$ | $[s_{N-1,0}, ..., s_{N-1,sN-1}]$ |

Location Cell Data 520

| Location Cell | Index | Weight |
|---|---|---|
| 0 | $[t_{0,0}, t_{0,1}, ..., t_{0,T0}]$ | $[s_{0,0}, s_{0,1}, ..., s_{0,s0}]$ |
| 1 | $[t_{1,0}, t_{1,1}, ..., t_{1,T1}]$ | $[s_{1,0}, s_{1,1}, ..., s_{1,s1}]$ |
| 2 | $[t_{2,0}, t_{2,1}, ..., t_{2,T2}]$ | $[s_{2,0}, s_{2,1}, ..., s_{2,s2}]$ |
| ... | ... | ... |
| n | $[t_{n,0}, t_{n,1}, ..., t_{n,Tn}]$ | $[s_{n,0}, s_{n,1}, ..., s_{n,sn}]$ |
| ... | ... | ... |
| N-1 | $[t_{N-1,0}, ..., t_{N-1,TN-1}]$ | $[s_{N-1,0}, ..., s_{N-1,sN-1}]$ |

Example Location Cell 530

| Location Cell | {Index, Weight} |
|---|---|
| 5 | $\{t_0, s_0\}$ |
|  | $\{t_3, s_3\}$ |
|  | ... |
|  | $\{t_n, s_n\}$ |

FIG. 6

| Location Cell | Row | Location Cell Data 610 | | | | | | | |
|---|---|---|---|---|---|---|---|---|---|
| | | aziMin | aziMax | eleMin | eleMax | radMin | radMax | aziCen | eleCen | radCen |
| DC(i) | 1 | $\theta_0$ | $\theta_1$ | $\Phi_0$ | $\Phi_1$ | $r_0$ | $r_1$ | $\theta_{0.5}$ | $\Phi_{0.5}$ | $r_{0.5}$ |
| | 2 | Number of Centroids $m$ |
| | 3 | Centroid Index $[c_0, c_1, \ldots c_{m-1}]$ |
| | 4 | Centroid Weight $[w_0, w_1, \ldots w_{m-1}]$ |
| | 5 | Number of Neighbors $n$ |
| | 6 | Neighbor Index $[DC_0, DC_1, \ldots DC_{n-1}]$ |

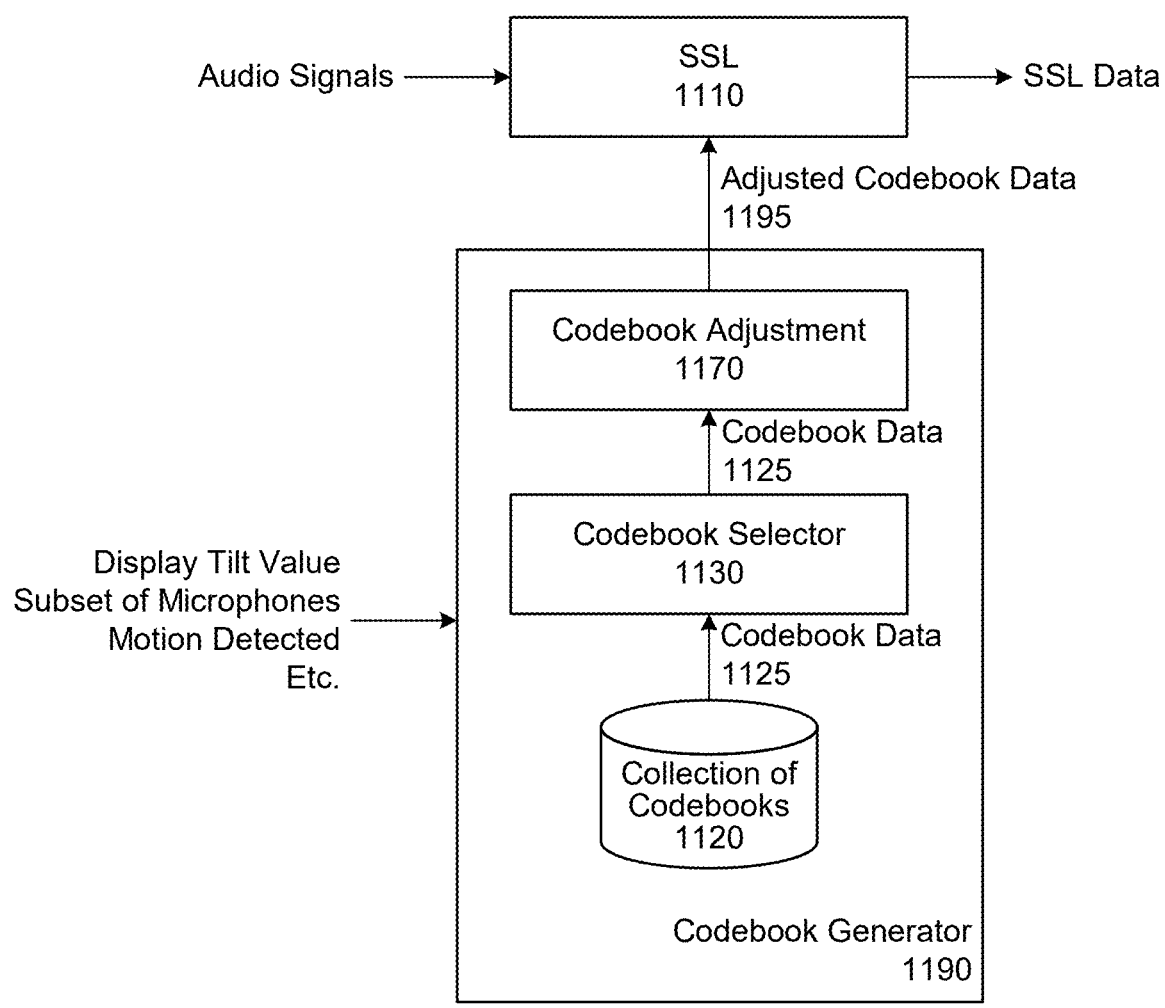

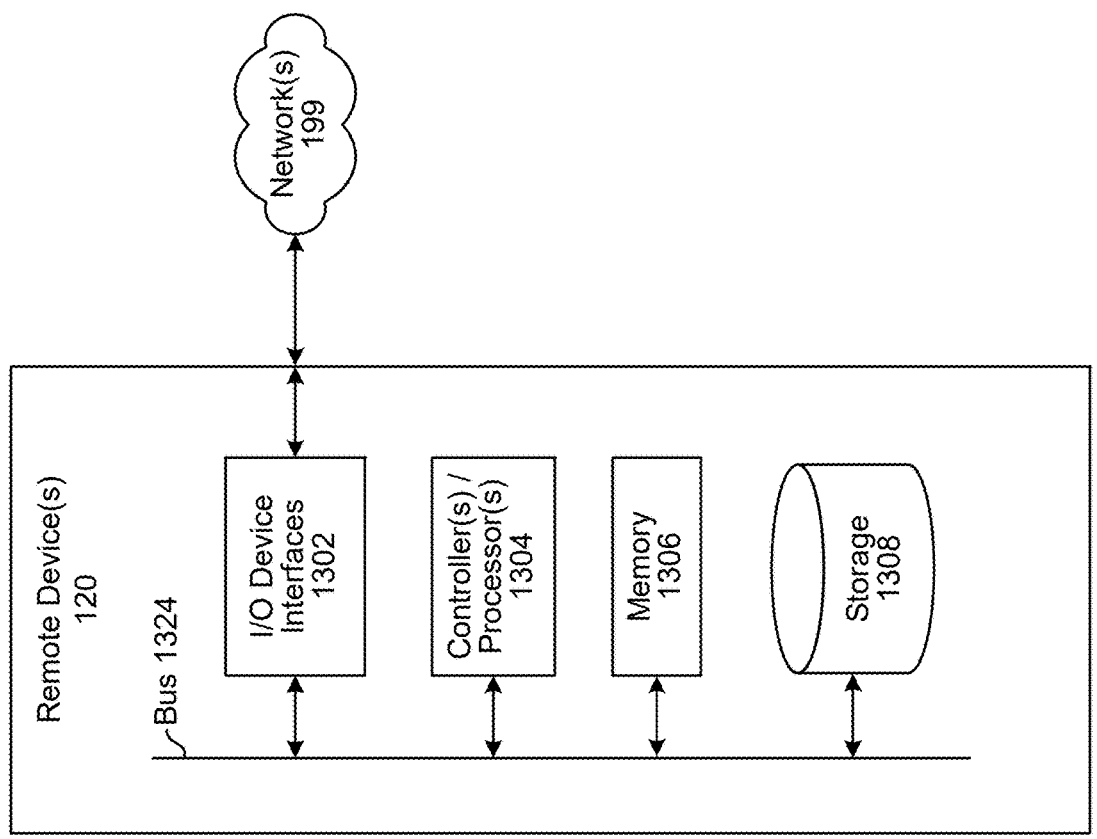

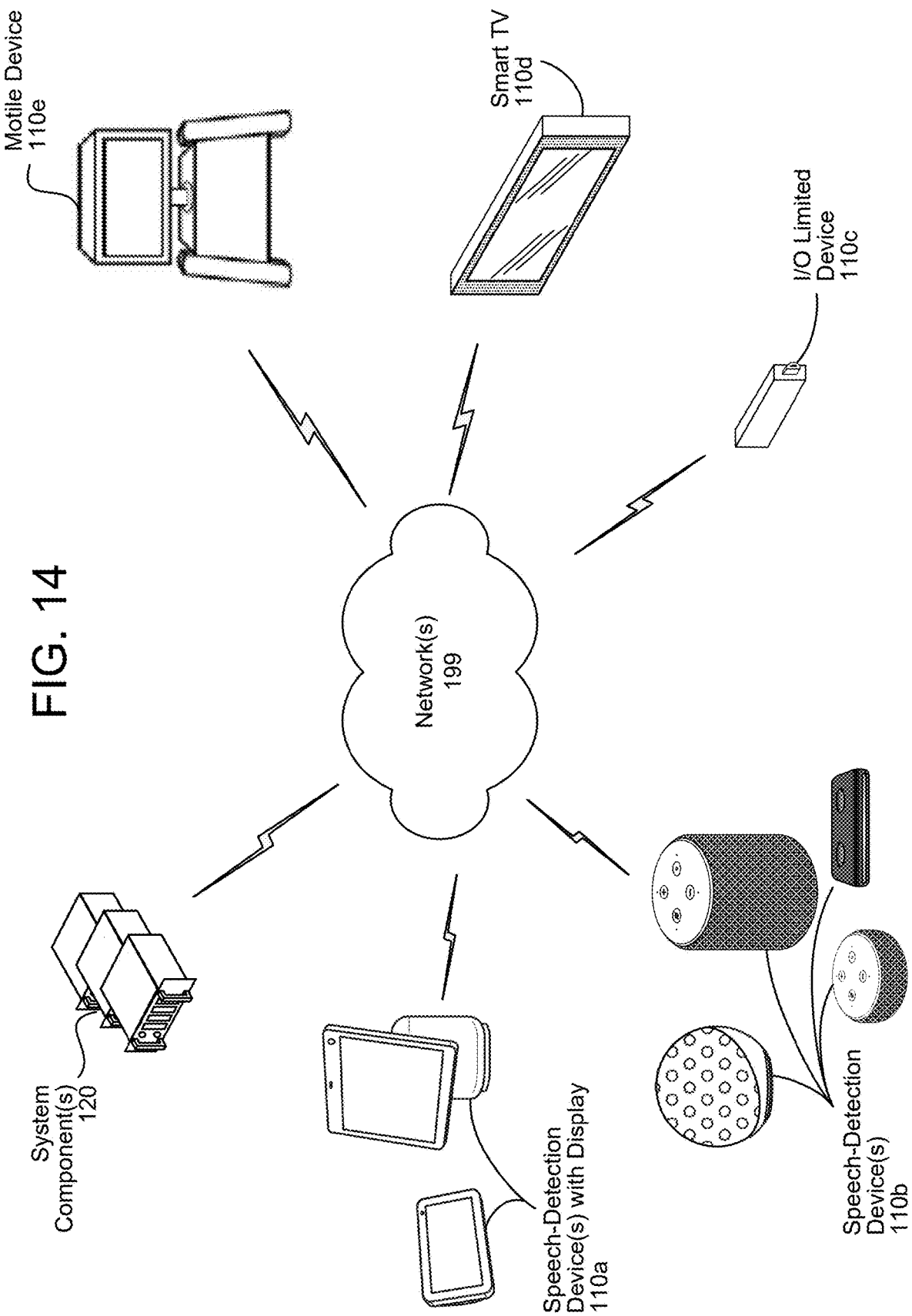

LOCATION ESTIMATION OF SOUND SOURCES

BACKGROUND

With the advancement of technology, the use and popularity of electronic devices has increased considerably. Electronic devices are commonly used to capture and process audio data.

BRIEF DESCRIPTION OF DRAWINGS

For a more complete understanding of the present disclosure, reference is now made to the following description taken in conjunction with the accompanying drawings.

FIG. 1 illustrates a system configured to perform three-dimensional (3D) direction finding of sound sources according to embodiments of the present disclosure.

FIGS. 3A-3C illustrate examples of location vector distribution, two-dimensional (2D) location cell structure, and 3D location cell structure according to embodiments of the present disclosure.

FIGS. 4A-4B illustrate examples of determining neighboring cells for each 3D location cell according to embodiments of the present disclosure.

FIG. 5 illustrates examples of location cell data according to embodiments of the present disclosure.

FIG. 6 illustrates an example of location cell data according to embodiments of the present disclosure.

FIGS. 11A-11C are flowcharts illustrating example methods for dynamically selecting and/or adjusting delay-direction codebooks according to embodiments of the present disclosure.

FIG. 13 is a block diagram conceptually illustrating example components of a remote system according to embodiments of the present disclosure.

FIG. 14 illustrates an example of a computer network for use with a speech processing system.

DETAILED DESCRIPTION

Figure 2:
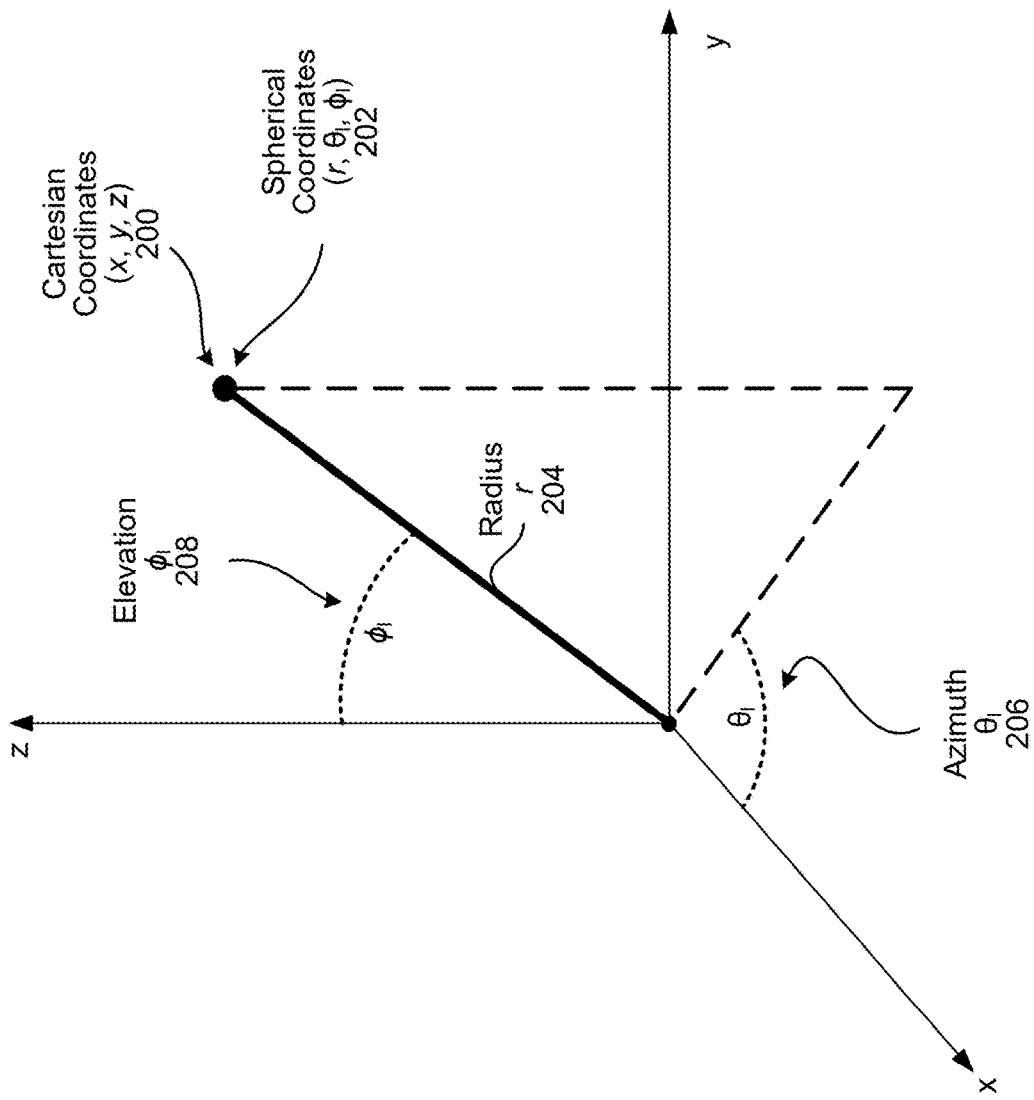
FIG. 2 illustrates an example of spherical coordinates and rectangular coordinates.

Electronic devices may be used to capture audio and process audio data. The audio data may be used for voice commands and/or sent to a remote device as part of a communication session. To process voice commands from a particular user or to send audio data that only corresponds to the particular user, the device may attempt to isolate desired speech associated with the user from undesired speech associated with other users and/or other sources of noise, such as audio generated by loudspeaker(s) or ambient noise in an environment around the device. For example, the device may perform sound source localization (SSL) to distinguish between multiple sound sources represented in the audio data.

To improve SSL processing, devices, systems and methods are disclosed that extend SSL processing to include distance information. For example, in addition to estimating a direction of a sound source (e.g., azimuth and/or elevation), the device may also estimate a distance associated with the sound source. Thus, instead of determining two-dimensional (2D) direction vectors, the device may determine three-dimensional (3D) location vectors, extending the SSL processing from 2D to 3D. Using the location vectors, the improved SSL processing may generate a location estimate for the sound source.

To enable the improved SSL processing, the device may include a delay-direction codebook, which is a collection of location vectors and corresponding delay vectors, such as time-differential of arrival (TDOA) vectors. As used herein, each delay vector contains time delays measured between each pair of microphones, and each delay vector is unique, such that no two delay vectors are equal in the codebook. Using the delay-direction codebook, the device may calculate power values as a function of direction. However, the location vectors correspond to location ranges that vary in size depending on the individual delay vector, such that an individual location vector in the codebook represents a centroid of an original cell having irregularly-shaped boundaries. These irregularly-shaped boundaries and/or variations in size increase a computational complexity associated with determining peak power values and estimating the sound source location.

To reduce a computational complexity and improve an accuracy of the SSL processing, the codebook may define a set of 3D location cells having a regular structure (e.g., consistent boundaries with predetermined uniformity and/or symmetry) and group the location vectors into these 3D location cells. For example, the set of 3D location cells may include rectangular cells having boundaries along a predefined grid, such that an individual 3D location cell defines a location range (e.g., 3D location range) corresponding to a 3D solid or prism within the environment (e.g., 3D shape with six faces that may include rectangular bases). Having boundaries that are orthogonal and consistent simplifies SSL processing and results in a substantial reduction in computational cost.

Using the 3D location cells, the device may identify peak power value(s) corresponding to sound source(s) and generate location estimate(s) for each sound source. For example, the codebook may associate each 3D location cell with (i) location vectors contained within the 3D location cell, (ii) weight values indicating a relative weight of each location vector for the 3D location cell, and (iii) neighboring 3D location cells. Using the codebook, the device can identify first location vectors and first weight values associated with an individual 3D location cell, determine first power values corresponding to the first location vectors, and calculate a weighted average of the first power values for the 3D location cell. In addition, the device can use the codebook to identify neighboring 3D location cells, enabling the device to determine peak power value(s) (e.g., perform peak detection) and generate location estimate(s) for one or more sound sources.

FIG. 1 illustrates a high-level conceptual block diagram of a system 100 configured to perform three-dimensional (3D) direction finding of sound sources according to embodiments of the present disclosure. Although FIG. 1, and other figures/discussion illustrate the operation of the system in a particular order, the steps described may be performed in a different order (as well as certain steps removed or added) without departing from the intent of the disclosure. As illustrated in FIG. 1, the system 100 may include a device 110 and system component(s) 120 that may be communicatively coupled to network(s) 199.

As will be described in greater detail below, FIG. 1 illustrates an example of the device 110 determining average power values using delay-direction codebook data and/or location cell data. In some examples, the system component(s) 120 may generate the delay-direction codebook data and/or the location cell data during an initialization stage and send this data to the device 110 to use during runtime operation. However, the disclosure is not limited thereto, and in other examples the device 110 may generate and/or modify the delay-direction codebook data and/or the location cell data without departing from the disclosure.

The device 110 may be an electronic device configured to capture and/or receive audio data. For example, the device 110 may include a microphone array configured to generate microphone audio data that captures input audio, although the disclosure is not limited thereto and the device 110 may include multiple microphones without departing from the disclosure. As is known and used herein, "capturing" an audio signal and/or generating audio data includes a microphone transducing audio waves (e.g., sound waves) of captured sound to an electrical signal and a codec digitizing the signal to generate the microphone audio data. Whether the microphones are included as part of a microphone array, as discrete microphones, and/or a combination thereof, the device 110 generates the microphone audio data using multiple microphones. For example, a first channel of the microphone audio data may correspond to a first microphone (e.g., k=1), a second channel may correspond to a second microphone (e.g., k=2), and so on until a final channel (K) corresponds to final microphone (e.g., k=K).

The audio data may be generated by a microphone array of the device 110 and therefore may correspond to multiple channels. For example, if the microphone array includes eight individual microphones, the audio data may include eight individual channels. The device 110 may perform sound source localization processing to separate the audio data based on sound source(s) and indicate when an individual sound source is represented in the audio data and/or a direction/location associated with the sound source.

To illustrate an example, the device 110 may detect a first sound source (e.g., first portion of the audio data corresponding to a first direction relative to the device 110), a second sound source (e.g., second portion of the audio data corresponding to a second direction relative to the device 110), and so on. Based on delay vectors measured by the microphone array, the device 110 may determine direction information indicating a direction of an individual sound source relative to the device 110. For example, the direction information may represent the direction using an azimuth value (e.g., value that varies between 0 and 360 degrees and represents a first angle relative to a horizontal axis) and/or an elevation value (e.g., value that varies between 0 and 90 degrees and represents a second angle relative to a vertical axis).

In addition to the direction information (e.g., azimuth value and/or elevation value), the device 110 may determine distance information associated with the sound source. For example, the device 110 may determine a distance value indicating a Euclidian distance from the device 110 to the sound source. Using the direction information and the distance information, the device 110 may generate a 3D location vector indicating a location associated with each sound source.

As used herein, the terms distance, radius, and depth may be used interchangeably to refer to the distance information without departing from the disclosure. For example, the distance to the sound source may be represented by a radius value measured in meters. For ease of illustration, radius values are illustrated as being limited by a fixed upper bound, such that radius values are capped at a maximum radius value (e.g., 3 m). Thus, all location vectors and/or sound sources are associated with a radius value within a fixed range that extends from a minimum radius value (e.g., 0 m), which corresponds to an origin point associated with the device 110, to a maximum radius value (e.g., 3 m). However, the disclosure is not limited thereto and the maximum radius value may vary without departing from the disclosure.

While the device 110 may detect multiple overlapping sound sources within the same portion of audio data, variations between the individual microphone channels enable the device 110 to distinguish between them based on their relative direction. Thus, the SSL data may include a first portion or first SSL data indicating when the first sound source is detected, a second portion or second SSL data indicating when the second sound source is detected, and so on. In some examples, the SSL data may include multiple SSL tracks (e.g., individual SSL track for each unique sound source represented in the audio data), along with additional information for each of the individual SSL tracks. For example, for a first SSL track corresponding to a first sound source, the SSL data may indicate a direction and/or location associated with the first sound source location, a signal quality metric (e.g., power value) associated with the first SSL track, and/or the like, although the disclosure is not limited thereto. For ease of illustration, an SSL track may be referred to as a sound track without departing from the disclosure. Thus, the device 110 may determine SSL data that includes a plurality of sound tracks, with individual sound track data corresponding to a single sound source.

To perform SSL processing, the device 110 may use Time Difference of Arrival (TDOA) processing, Time of Arrival (TOA) processing, Delay of Arrival (DOA) processing, and/or the like, although the disclosure is not limited thereto. For ease of illustration, the following description will refer to using TDOA processing, although the disclosure is not limited thereto and the device 110 may perform SSL processing using other techniques without departing from the disclosure. SSL processing, such as steered response power (SRP), relies on a delay-direction codebook in order to calculate power as a function of direction. For example, the device 110 may use the delay-direction codebook to calculate power values and may then use the power values to estimate a direction associated with the sound source.

The codebook may consist of a collection of delay vectors (e.g., TDOA vectors) together with location vectors, and the codebook may be determined based on a configuration of the microphone array, locations of the microphones, physical dimensions or shape of an enclosure of the device 110, and/or the like without departing from the disclosure. The location vectors may be represented as spherical coordinates (e.g., azimuth θ, elevation Φ, and radius r) and/or as rectangular coordinates (e.g., three components in the x, y, and z axes, with the resultant vector having unit length) without departing from the disclosure, and the device 110 may convert from one representation to the other without departing from the disclosure. Regardless of whether the location vector is represented using spherical coordinates or rectangular coordinates, the location vector may correspond to a distance value (e.g., radius=distance=$\sqrt{x^2+y^2+z^2}$). Thus, each delay vector (e.g., delay vector data) may be associated with 3D coordinates and may correspond to a distance value.

As used herein, a vector may include two or more values and may be represented by vector data. Thus, a delay vector may correspond to delay values and/or delay vector data without departing from the disclosure. For ease of illustration, the delay vectors may be referred to as TDOA vectors, TDOA delay vectors, delay vector values, TDOA delay values, delay vector data, TDOA vector data, and/or the like without departing from the disclosure. Similarly, the location vectors may be referred to as location vector values, location vector data, and/or the like.

As used herein, each delay vector contains time delays measured between each pair of microphones. In some examples each delay vector is unique, such that no two delay vectors are equal in the codebook. For example, a first entry in a delay vector may correspond to a first time delay between receipt, by a first microphone, of audio output by a sound source and receipt of the audio by a second microphone. In addition, the first time delay may correspond to a location difference between a first location associated with the first microphone and a second location associated with the second microphone. Similarly, a second entry in the delay vector may correspond to a second time delay between receipt of the audio by the first microphone and receipt of the audio by a third microphone, and so on for each pair of microphones. Thus, the second time delay may correspond to a location difference between the first location associated with the first microphone and a third location associated with the third microphone. Thus, the delay vector may include a series of time delay values associated with the microphone pairs.

As will be described in greater detail below, a single series of time delay values may correspond to multiple locations, which may be referred to as candidate location vectors, depending on the geometry of the microphone array. If the codebook only includes unique delay vectors, however, the system 100 may combine multiple candidate location vectors that correspond to the same series of time delay values. For example, the system 100 may select a cluster of candidate location vectors associated with an individual delay vector and may determine a centroid representing a location range associated with the cluster of candidate location vectors. Thus, the unique delay vector may correspond to a location vector representing the cluster of candidate location vectors (e.g., spatial cluster), and spatial cluster data may represent one or more location vectors, although the disclosure is not limited thereto.

Using the delay-direction codebook, the device may calculate power values as a function of direction. However, the location vectors correspond to location ranges that vary in size depending on the individual delay vector, such that an individual location vector in the codebook represents a centroid of an original cell having irregularly shaped boundaries. These irregularly shaped boundaries and/or variations in size increase a computational complexity associated with determining peak power values and estimating the sound source location.

To reduce a computational complexity and improve an accuracy of the SSL processing, the system 100 may represent the environment using perpendicular boundaries. In some examples, the codebook may define a set of 3D location cells having a regular structure (e.g., consistent boundaries with predetermined uniformity and/or symmetry) and group the location vectors into these 3D location cells. For example, the set of 3D location cells may include rectangular cells having boundaries along a predefined grid, such that an individual 3D location cell defines a location range (e.g., 3D location) corresponding to a 3D solid or prism within the environment (e.g., 3D shape with six faces that may include rectangular bases). FIG. 1 illustrates an example of 3D location cells 102, with boundaries defined using spherical coordinates (e.g., azimuth θ, elevation Φ, and radius r). Having boundaries that are orthogonal and consistent simplifies SSL processing and results in a substantial reduction in computational cost.

Using the 3D location cells, the device may identify peak power value(s) corresponding to sound source(s) and generate location estimate(s) for each sound source. For example, the codebook may associate each 3D location cell with (i) location vectors contained within the 3D location cell, (ii) weight values indicating a relative weight of each location vector for the 3D location cell, and (iii) neighboring 3D location cells. Using the codebook, the device can identify first location vectors and first weight values associated with an individual 3D location cell, determine first power values corresponding to the first location vectors, and calculate a weighted average of the first power values for the 3D location cell. In addition, the device can use the codebook to identify neighboring 3D location cells, enabling the device to determine peak power value(s) (e.g., perform peak detection) and generate location estimate(s) for one or more sound sources.

As described above, the delay-direction codebook data (e.g., codebook) may consist of a collection of delay vectors (e.g., TDOA vectors) together with 3D location vectors. In some examples, the codebook may also include location cell data that consists of information defining the set of 3D location cells and associating the delay vectors with corresponding 3D location cells, as described in greater detail below. For example, the codebook data may include a first portion associating the delay vectors with corresponding 3D location vectors, along with a second portion associating the delay vectors with corresponding 3D location cells. However, the disclosure is not limited thereto, and in other examples the codebook data may be limited to the delay vectors and corresponding 3D location vectors, and the location cell data may separately associate the delay vectors with corresponding 3D location cells without departing from the disclosure.

In some examples, the system component(s) 120 may generate the delay-direction codebook data and/or the location cell data during an initialization stage and send this data to the device 110 to use during runtime operation. However, the disclosure is not limited thereto, and in other examples the device 110 may generate and/or modify the delay-direction codebook data and/or the location cell data without departing from the disclosure. For example, the device 110 may generate the delay-direction codebook data and/or the location cell data during an initialization stage, during runtime operation, and/or the like without departing from the disclosure.

As illustrated in FIG. 1, the device 110 may retrieve (130) codebook data including location vectors and TDOA vectors, and may retrieve (132) location cell data for a plurality of location cells. While FIG. 1 illustrates retrieving the codebook data and the location cell data as two separate steps, the disclosure is not limited thereto and the device 110 may retrieve the codebook data and the location cell data in a single step without departing from the disclosure. For example, the codebook data may include both (i) first associations between the location vectors and TDOA vectors and (ii) second associations between the plurality of location cells and the location vectors and/or the TDOA vectors without departing from the disclosure. Codebook data, location vectors, TDOA vectors, location cell data, and location cells are described in greater detail below with regard to FIGS. 3C-6.

The device 110 may generate (134) audio data using microphones, may determine (136) cross-correlation data for all microphone pairs, and may determine (138) first power values for 3D location vectors. For example, the device 110 may perform TDOA processing to the audio data to generate TDOA delay values, may use the codebook data to determine the TDOA vector indexes based on the TDOA delay values, and may calculate the first power values, which include a power value associated with each of the TDOA vector indexes.

Using the first power values and the location cell data, the device 110 may determine (140) second power values for the 3D location cells 102. For example, the device 110 may determine a weighted average for a first 3D location cell using a subset of the first power values that correspond to 3D location vectors (e.g., TDOA vector indexes) associated with the first 3D location cell. In some examples, the location cell data may include weight values associated with each of the 3D location vectors, such that the device 110 may determine the weighted average by multiplying the weight values by corresponding power values from the subset of the first power values. However, the disclosure is not limited thereto, and the device 110 may determine the second power values using other techniques without departing from the disclosure.

As illustrated in FIG. 1, the device 110 may locate (142) peak value(s) corresponding to sound source(s). As described in greater detail below with regard to FIGS. 4A-4B, the device 110 may compare a power value associated with the first 3D location cell to power values associated with neighboring location cells. To facilitate performing peak detection, the location cell data may include an association between the first 3D location cell and each neighboring location cell, although the disclosure is not limited thereto. If the power value associated with the first 3D location cell is higher than the neighboring location cells, the first 3D location cell corresponds to a local maxima and the device 110 may associate it with a sound source. If one of the neighboring location cells is associated with a higher power value, the device 110 may continue to perform peak detection until identifying the 3D location cell that is higher than all of the neighboring location cells.

In some examples, the device 110 may determine a number of peaks (e.g., local maxima) and associate each peak value with a corresponding sound source. For example, the device 110 may perform peak detection to identify two peak values corresponding to two sound sources and may generate and/or update two sound tracks to include location information associated with each sound source. However, the disclosure is not limited thereto, and the device 110 may identify three or more peak values corresponding to three or more sound sources without departing from the disclosure.

While not illustrated in FIG. 1, in some examples the device 110 may perform reflection detection and classification to identify a single peak value corresponding to each sound source. For example, the device 110 may identify two or more peak values represented in the second power values, with a first peak value corresponding to a direct path (e.g., incident sound waves, direct component, etc.) from a first sound source, while one or more peak values correspond to reflections (e.g., acoustic reflections, reflected sound waves, etc.) originating from the first sound source. The device 110 may associate the first peak value with the first sound source and ignore the one or more peak values without departing from the disclosure.

After determining the power values and locating the peak value(s), the device 110 may perform (144) sound source localization (SSL) processing and generate individual sound tracks. For example, the device 110 may identify a local peak represented in the power values, determine an estimated location of a sound source corresponding to the local peak, and associate the estimated location with a sound track corresponding to the sound source. Thus, an individual sound track may associate an estimated location with a corresponding sound source, enabling the device 110 to monitor the location of the sound source over time. By performing sound source localization, in some examples the system may identify a sound source associated with desired speech and may use the SSL data (e.g., sound tracks) to track this sound source over time. For example, the device 110 may isolate a portion of the audio data corresponding to a first sound source and may cause the portion of the audio data to be processed to determine a voice command.

Within a short time window, the device 110 may associate each unique sound source with a corresponding sound track, such that a number of active sound tracks is equal to a number of active sound sources. If a sound source is only active intermittently, however, and especially if the sound source moves or changes a location while inactive, the device 110 may associate two or more sound tracks with a single sound source without departing from the disclosure. In some examples, the device 110 may determine that two sound tracks correspond to the same sound source and may combine the sound track information accordingly. For example, the device 110 may identify a user and/or use additional sensor information to determine that the two sound tracks correspond to the same sound source, although the disclosure is not limited thereto.

While the example illustrated above distinguishes between performing peak detection (e.g., locating the peak values) in step 142 and performing SSL processing in step 144, the disclosure is not limited thereto and performing SSL processing may inherently include performing peak detection without departing from the disclosure. For example, steps 142-144 are illustrated as separate steps in FIG. 1 in order to conceptually illustrate how the neighboring cell information included in the codebook data enables the device 110 to efficiently perform peak detection due to the location cells having regular structure and consistent boundaries. However, the device 110 may perform both peak detection and SSL processing as a single step without departing from the disclosure.

In some examples, the device 110 may be configured to perform natural language processing to determine the voice command and may perform an action corresponding to the voice command. However, the disclosure is not limited thereto and in other examples the device 110 may be configured to send the portion of the audio data to a natural language processing system to determine the voice command without departing from the disclosure.

An audio signal is a representation of sound and an electronic representation of an audio signal may be referred to as audio data, which may be analog and/or digital without departing from the disclosure. For ease of illustration, the disclosure may refer to either audio data (e.g., microphone audio data, input audio data, etc.) or audio signals (e.g., microphone audio signal, input audio signal, etc.) without departing from the disclosure. Additionally or alternatively, portions of a signal may be referenced as a portion of the signal or as a separate signal and/or portions of audio data may be referenced as a portion of the audio data or as separate audio data. For example, a first audio signal may correspond to a first period of time (e.g., 30 seconds) and a portion of the first audio signal corresponding to a second period of time (e.g., 1 second) may be referred to as a first portion of the first audio signal or as a second audio signal without departing from the disclosure. Similarly, first audio data may correspond to the first period of time (e.g., 30 seconds) and a portion of the first audio data corresponding to the second period of time (e.g., 1 second) may be referred to as a first portion of the first audio data or second audio data without departing from the disclosure. Audio signals and audio data may be used interchangeably, as well; a first audio signal may correspond to the first period of time (e.g., 30 seconds) and a portion of the first audio signal corresponding to a second period of time (e.g., 1 second) may be referred to as first audio data without departing from the disclosure.

In some examples, the audio data may correspond to audio signals in a time-domain. However, the disclosure is not limited thereto and the device 110 may convert these signals to a subband-domain or a frequency-domain prior to performing additional processing, such as adaptive feedback reduction (AFR) processing, acoustic echo cancellation (AEC), adaptive interference cancellation (AIC), noise reduction (NR) processing, tap detection, and/or the like. For example, the device 110 may convert the time-domain signal to the subband-domain by applying a bandpass filter or other filtering to select a portion of the time-domain signal within a desired frequency range. Additionally or alternatively, the device 110 may convert the time-domain signal to the frequency-domain using a Fast Fourier Transform (FFT) and/or the like.

As used herein, audio signals or audio data (e.g., microphone audio data, or the like) may correspond to a specific range of frequency bands. For example, the audio data may correspond to a human hearing range (e.g., 20 Hz-20 kHz), although the disclosure is not limited thereto.

FIG. 2 illustrates an example of spherical coordinates, which may be used throughout the disclosure with reference to acoustic waves relative to the microphone array. As illustrated in FIG. 2, Cartesian coordinates (x, y, z) 200 correspond to spherical coordinates (r, $\theta_1$, $\phi_1$) 202. Thus, using Cartesian coordinates, a location may be indicated as a point along an x-axis, a y-axis, and a z-axis using coordinates (x, y, z), whereas using spherical coordinates the same location may be indicated using a radius r 204, an azimuth $\theta_1$ 206, and an elevation $\phi_1$ 208 (e.g., polar angle). The radius r 204 indicates a radial distance of the point from a fixed origin, the azimuth $\theta_1$ 206 indicates an azimuth angle of its orthogonal projection on a reference plane that passes through the origin and is orthogonal to a fixed zenith direction, and the elevation $\phi_1$ 208 indicates a polar angle measured from the fixed zenith direction. Thus, the azimuth $\theta_1$ 206 varies between 0 and 360 degrees, while the elevation ¢1 208 varies between 0 and 180 degrees.

As described above with regard to FIG. 1, the device 110 may generate audio data using a microphone array of the device 110 and therefore the audio data may correspond to multiple channels. For example, if the microphone array includes eight individual microphones, the audio data may include eight individual channels. The device 110 may perform sound source localization (SSL) processing using the audio data to generate SSL data. For example, the device 110 may perform SSL processing to separate the audio data based on sound source and indicate when an individual sound source is represented in the audio data.

As described above, the device 110 may perform SSL processing, such as steered response power (SRP), which relies on a delay-direction codebook in order to calculate power as a function of direction. For example, the device 110 may use the delay-direction codebook to calculate the power values and may then use the power values to estimate a direction associated with the sound source.

The codebook may consist of a collection of delay vectors (e.g., TDOA vectors) together with location vectors, and the codebook may be determined based on the locations of the microphones and the physical dimensions or shape of an enclosure of the device 110. The location vectors may be represented as either spherical coordinates (e.g., azimuth $\theta$ and elevation $\Phi$) and/or as rectangular coordinates (e.g., three components in the x, y, and z axes, with the resultant vector having unit length), and the device 110 may convert from one representation to the other without departing from the disclosure.

The delay-location codebook for SRP location consists of $$\{a_m, t_m\}, m=0 \text{ to } M-1 \qquad [1]$$

where $a_m$ denotes the 3D location vectors, $t_m$ denotes the time-differential of arrival (TDOA) vectors, and M is the codebook size. Each TDOA vector contains time delays measured between two microphones.

In some examples, the device 110 may perform codebook generation to generate an initial codebook and then reduce a number of delay vectors to generate a final codebook. For example, the device 110 may generate a first set of $M_0$ candidate location vectors (e.g., $a_m$, where m=0 to $M_0$-1) and the initial codebook may include each of the $M_0$ candidate location vectors. Thus, the initial codebook may represent all potential directions of sound sources (e.g., depending on a desired resolution) with respect to the microphone array and/or the device 110. In contrast, the final codebook may include a second set of $M_1$ candidate location vectors (e.g., $a_m$, where m=0 to $M_1$-1) that corresponds to a subset of the potential directions of sound sources, as described in greater detail below.

The number of candidate location vectors (e.g., $M_0$) may vary depending on a desired resolution associated with the codebook and/or the device 110. For example, if the device 110 includes a small number of microphones, an individual TDOA value may correspond to a large range of directions, so the device 110 may generate the codebook using a lower resolution. In contrast, if the device 110 includes a large number of microphones, the TDOA values may correspond to a small range of directions, so the device 110 may generate the codebook using a higher resolution to take advantage of the increased precision offered by the large number of microphones.

In some examples, the device 110 may generate the candidate location vectors based on an elevation increment, an azimuth range, an elevation range, and/or a distance value (e.g., radius), although the disclosure is not limited thereto. While the system 100 may generate the candidate location vectors using a variety of techniques without departing from the disclosure, SSL processing may be improved if the candidate location vectors are near-uniformly distributed for the entire sphere: $\theta \in [-\pi, \pi]$ and $\phi \in [0, \pi]$. Thus, each candidate location vector may be specified by spherical coordinates $\{r, \theta, \phi\}$, which can also be converted to rectangular coordinates $\{x, y, z\}$.

The microphone array may include K microphones, with known locations given by:

$$u_n = \begin{bmatrix} x_n \\ y_n \\ z_n \end{bmatrix}, n = 0 \text{ to } K-1 \qquad [2]$$

where $u_n$ indicates three-dimensional (3D) coordinates of the nth microphone, which are expressed in some unit of distance (e.g., meter). Depending on the microphone locations, and the direction-of-arrival of a given sound, said sound reaches different microphones at different times. By measuring the TDOA caused by the sound, it is possible to estimate the direction-of-arrival. For example, there are a total of:

$$P = \binom{K}{2} = \frac{K(K-1)}{2} \qquad [3]$$

microphone pairs for which the device 110 must calculate delay values in order to accurately estimate the direction-of-arrival. Thus, each TDOA vector may include P elements, which is the number of microphone pairs with K as the number of microphones.

Table 1 shows an example of microphone indices for the case of K=4. For example, a first microphone pair may include Mic0 and Mic1, a second microphone pair may include Mic0 and Mic2, and so on.

TABLE 1

The indices for microphone pairs when K = 4.

| k | index0 | index1 |
|---|--------|--------|
| 0 | 0 | 1 |
| 1 | 0 | 2 |
| 2 | 0 | 3 |
| 3 | 1 | 2 |
| 4 | 1 | 3 |
| 5 | 2 | 3 |

In order to estimate the direction-of-arrival, the device 110 may find a TDOA vector for each location vector. To find the TDOA vector, the device 110 may calculate the location difference vectors using:

$$d_k = u_{index1[k]} - u_{index0[k]}, k=0 \text{ to } P-1 \qquad [4]$$

where $d_k$ denotes the location difference vector for an individual microphone pair, which is a 3D vector with the three elements of the vector representing distance quantities.

Given the candidate location vectors (e.g., $a_m$) and the location difference vectors $d_k$ described above, the device 110 may determine elements of the TDOA vectors, as shown below:

$$\tau_{m,k} = a_m^T d_k / c \qquad [5]$$

where $\tau_{m,k}$ denotes a time delay, the candidate location vectors $a_m$ are unit-length 3D vectors representing a direction in rectangular coordinates, and c is the speed of sound (e.g., 343 m/s).

The resulting time delay $\tau_{m,k}$ is a real number (or floating-point number) that may be negative or positive, measured in seconds. Thus, the device 110 may convert the time delay $\tau_{m,k}$ to a positive integer in the range of [0, intFactor·N−1], with intFactor a positive integer interpolation factor, and N the length of discrete Fourier transform (DFT) used. Typically DFT is used in cross-correlation calculation. The conversion is done with $$t = \text{modulo}(\text{round}(\tau \cdot fs \cdot \text{intFactor}), \text{intFactor} \cdot N) \qquad [6]$$

where fs is a sampling frequency measured in Hertz (Hz), and round(x) is a function that rounds x to the nearest integer. Given |x|<N, then:

$$\text{mod } ulo(x, N) = \begin{cases} x, & \text{if } x \geq 0 \\ x + N, & \text{otherwise} \end{cases} \qquad [7]$$

The device 110 may calculate (330) the TDOA vectors as:

$$t_m = \begin{bmatrix} t_{m,0} \\ t_{m,1} \\ \vdots \\ t_{m,P-1} \end{bmatrix}, m = 0 \text{ to } M-1 \qquad [8]$$

where $t_m$ denotes a TDOA vector containing P elements (k=0 to P−1), where the kth element ($\tau_{m,k}$) contains the time delay between the microphones at index0[k] and index1[k] having values in the range of [0, intFactor·N−1], with N equal to the DFT length used in cross-correlation calculation.

In some examples, the set of $M_0$ candidate location vectors (e.g., $a_m$, where m=0 to $M_0$−1), together with the associated $M_0$ TDOA vectors $t_m$, may be jointly referred to as the initial delay-direction codebook:

$$\{a_m, t_m\}, m=0 \text{ to } M_0-1 \qquad [9]$$

with $M_0$ the size of the codebook. However, as multiple candidate location vectors may map to the same TDOA vector, the initial codebook may include redundant information. When performing SRP processing, this redundancy results in wasted computation, as the device 110 can only distinguish directions having different TDOA vectors.

To improve efficiency, the device 110 may perform clustering to group the candidate location vectors based on a number of unique TDOA vectors. For example, the device 110 may compare the $M_0$ TDOA vectors with each other, creating a new TDOA vector index for each unique TDOA vector, which results in $M_1$ distinct TDOA vector indexes. As used herein, a TDOA vector index may be referred to as a TDOA index or index without departing from the disclosure. As part of determining the TDOA indexes, the device 110 may assign a corresponding TDOA index to each of the $M_0$ candidate location vectors, such that if different candidate location vectors are associated with the same TDOA vector, they are assigned the same TDOA index.

After assigning the $M_0$ candidate location vectors a corresponding TDOA vector, the device 110 may group together candidate location vectors having the same TDOA index. By clustering these candidate location vectors together, the device 110 may generate a set of $M_1$ clustered location vectors (e.g., $a_m$, where m=0 to $M_1$−1) that have a 1:1 correspondence with the $M_1$ TDOA vectors. For example, the device 110 may average the rectangular coordinates of candidate location vectors for each TDOA index to determine centroids, and then apply the arithmetic mean to determine the final location vectors of the centroids. To illustrate an example, the device 110 may determine that first candidate location vectors are associated with a first TDOA index $t_1$, may accumulate the parameters for all of the first candidate location vectors to determine a first centroid, and then may apply the arithmetic mean to determine a first clustered location vector ai corresponding to the first centroid. In some examples, the device 110 may determine the final location vectors by determining the azimuth, elevation, and/or distance of each centroid using the rectangular coordinates.

The set of $M_1$ clustered location vectors (e.g., $a_m$, where m=0 to $M_1-1$), together with the associated $M_1$ TDOA vectors $t_m$, may be jointly referred to as the final delay-direction codebook:

$$\{a_m, t_m\}, m=0 \text{ to } M_1-1 \qquad [10]$$

with $M_1$ the size of the final codebook. Examples of direction clusters (e.g., collection of candidate location vectors associated with the same TDOA index) and direction centroids (e.g., clustered location vectors stored in the final codebook) are shown below.

Figure 3B:
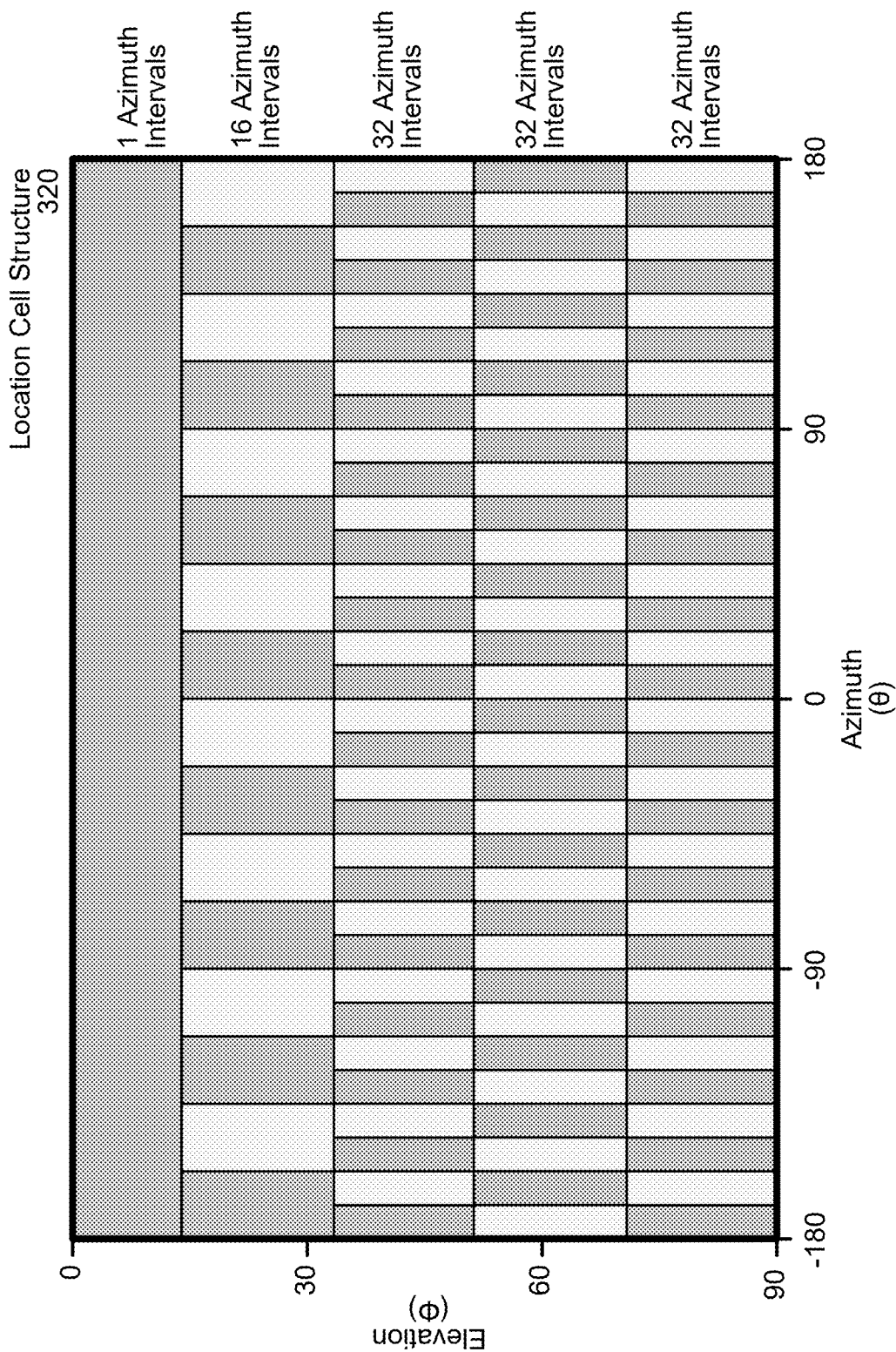
Figure 3C:
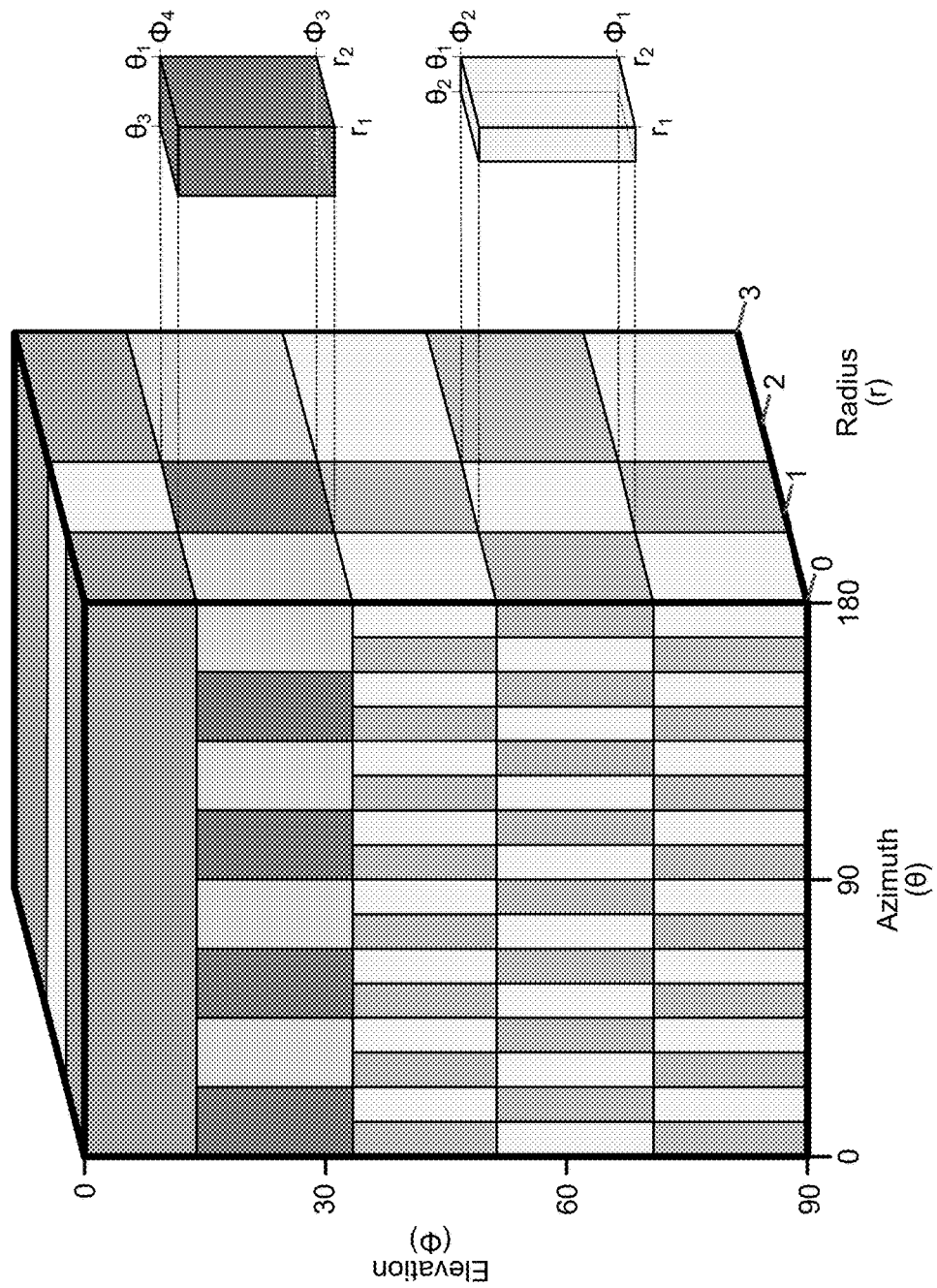

FIGS. 3A-3C illustrate examples of location vector distribution, two-dimensional (2D) location cell structure, and 3D location cell structure according to embodiments of the present disclosure. As described above, a plurality of candidate location vectors may be near-uniformly distributed for the entire sphere, extending from a minimum azimuth (e.g., $\theta_{min}=-\pi$ radians or $-180°$) to a maximum azimuth (e.g., $\theta_{max}=\pi$ radians or $180°$) and from a minimum elevation (e.g., $\phi_{min}=0$ radians or $0°$) to a maximum elevation (e.g., $\phi_{max}=\pi/2$ radians or $90°$). Thus, each candidate location vector may be specified by the pair $\{\theta_m, \phi_m\}$. However, the distribution of direction clusters (e.g., location vectors) is not nearly as uniform.

As illustrated in FIG. 3A, each location vector is represented in location vector distribution 310 as an individual dot. However, FIG. 3A illustrates normalized location vectors, such that the horizontal axis corresponds to azimuth values between $[-180°, 180°]$ and the vertical axis corresponds to elevation values between $[0°, -90°]$. Thus, the location vector distribution 310 extends from a minimum azimuth (e.g., $\theta_{min}=-180°$) to a maximum azimuth (e.g., $\theta_{max}=180°$) and from a minimum elevation (e.g., $\phi_{min}=0$) to a maximum elevation (e.g., $\phi_{max}=90°$). While not illustrated in FIG. 3A, the location vectors also extend from a minimum radius (e.g., $r_{min}=0$) to a maximum radius (e.g., $r_{max}=3$). Thus, the location vector distribution 310 only illustrates the location vectors associated with a single radius value.

While the final delay-direction codebook reduces the number of location vectors (e.g., from $M_0$ to $M_1$) and corresponding computational consumption, the distribution of location vectors is irregular as the density of centroids varies within the range of interest. This irregularity makes further processing more challenging and costly. To illustrate an example, in order for the device 110 to determine whether a power peak is present at a given direction, the device 110 must compare the power at the given direction to powers at neighboring directions. However, as the location vectors are irregularly distributed, finding the neighboring directions becomes more complicated and results in a high computational cost. This irregularity is illustrated by the locations of the direction centroids shown in FIG. 3A.

To facilitate power data analysis and simplify the process of comparing power values between neighboring directions, the device 110 may group the location vectors into location cells with a regular structure. The device 110 may group the location vectors into the location cells according to a desired resolution and coverage, and this grouping may simplify management of system resources and result in a substantial reduction in computational cost. For example, each location cell may represent a partition of the direction space (e.g., $\theta \in [-\pi, \pi]$ and $\phi \in [0, \pi/2]$ in radians, or $\theta \in [-180°, 180°]$ and $\phi \in [0°, 90°]$ in degrees), with the partition having predetermined uniformity and/or symmetry. In some examples, the device 110 may perform power averaging based on the location cells and may find peaks in the power data using stored location cell data. For example, based on the location cells and the boundaries of each location cell, the device 110 may assign different location vectors to the location cell, with the average power of the location cell found using a weighted average process, which is described in greater detail below.

In some examples, the device 110 may partition the entire space into location cells, where each location cell has well-defined boundaries specified by four numbers: aziMin, aziMax, eleMin, and eleMax. Using these boundary values, the device 110 may determine that a location vector given by an azimuth and elevation ($\theta_m, \phi_m$) is inside the location cell if aziMin$\leq\theta_m\leq$aziMax and eleMin$\leq\phi_m\leq$eleMax. There are multiple techniques by which the device 110 may partition the space to form cells, but the device 110 may focus on a top semi-sphere with boundaries $\theta \in [-180°, 180°]$ and $\phi \in [0°, 90°]$, although the disclosure is not limited thereto.

In some examples, the device 110 may partition the space using a uniform division of the entire range of elevation into a number of intervals, with the number of azimuth divisions given for each elevation interval. For example, the device 110 may determine to partition the space into five elevation intervals (e.g., numEle=5) and may divide the elevation evenly so that each of the five elevation intervals have an identical height (e.g., $\Delta\phi=90°/5=18°$). However, the disclosure is not limited thereto and the device 110 may partition the space into five elevation intervals of varying sizes without departing from the disclosure. An example of non-uniform elevation intervals is illustrated as location cell structure 320 in FIG. 3B.

As illustrated in FIG. 3B, the location cell structure 320 includes five elevation intervals (e.g., numEle=5) having non-uniform boundaries (e.g., ele={0, 14, 33, 52, 71, 90}). Thus, the first elevation interval corresponds to a first elevation range (e.g., $0°\leq\phi\leq14°$), the second elevation interval corresponds to a second elevation range (e.g., $14°<\phi\leq33°$), the third elevation interval corresponds to a third elevation range (e.g., $33°<\phi\leq52°$), the fourth elevation interval corresponds to a fourth elevation range (e.g., $52°<\phi\leq71°$), and the fifth elevation interval corresponds to a fifth elevation range (e.g., $710°<\phi\leq90°$), although the disclosure is not limited thereto.

While the device 110 partitions the space into the five elevation intervals, a number of azimuth divisions may vary between the five elevation intervals. As illustrated in FIG. 3B, the device 110 may divide the first elevation interval into 1 location cell, the second elevation interval into 16 location cells, the third elevation interval into 32 location cells, the fourth elevation interval into 32 location cells, and the fifth elevation interval into 32 location cells (e.g., numAzi={1, 16, 32, 32, 32}). Thus, the device 110 may determine that the first two elevation intervals are slightly different than the other three elevation intervals, although the disclosure is not limited thereto. This results in a total of 113 location cells, but the number of location vectors included in each location cell has large variations, which is impairs processing as uniform distribution is ideal. However, the disclosure is not limited thereto and the device 110 may partition the space using different numbers of elevation intervals, azimuth divisions, and/or the like without departing from the disclosure.

Once the device 110 defines the location cell structure, each location cell may be associated with boundaries specified by an azimuth range (e.g., aziMin to aziMax) and an elevation range (e.g., eleMin to eleMax). Thus, an individual location cell (e.g., data record) represents a location range relative to the microphone array, such as a small partition of the direction space (e.g., segment of the environment as viewed from the device 110). For example, a first location cell (e.g., first data record) may correspond to a first location range extending from a first azimuth (e.g., $aziMin_0$) to a second azimuth (e.g., $aziMax_0$) and from a first elevation (e.g., $eleMin_0$) to a second elevation (e.g., $eleMax_0$), a second location cell (e.g., second data record) may correspond to a second location range extending from the second azimuth (e.g., $aziMin_1$) to a third azimuth (e.g., $aziMax_1$) and from the first elevation (e.g., $eleMin_1$) to the second elevation (e.g., $eleMax_1$), and so on.

In addition, as the device 110 defines the location cell structure by splitting the elevation range into elevation intervals and dividing each elevation interval into a fixed number of azimuth divisions, each location cell within an elevation interval may have a uniform size location range. For example, a first size of the first location range corresponding to the first location cell described above is equal to a second size of the second location range corresponding to the second location cell, as the first location range and the second location range have the same azimuth width and elevation height. However, the location ranges only have a uniform size within each elevation interval, as a number of azimuth divisions may vary between elevation intervals. Additionally or alternatively, the disclosure is not limited thereto and the location ranges may have a non-uniform size within an elevation interval without departing from the disclosure.

While FIG. 3B illustrates an example of location cell structure 320 corresponding to a set of 2D location cells, the disclosure is not limited thereto. Instead, the device 110 may improve SSL processing by determining 3D location vectors and defining a set of 3D location cells that encompass the 3D location vectors. As illustrated in FIG. 3C, 3D location cell structure 330 extends the location cell structure 320 using a third dimension, such that the 3D location cells are associated with boundaries specified by an azimuth range (e.g., aziMin to aziMax), an elevation range (e.g., eleMin to eleMax), and a distance range (e.g., radMin to radMax). Thus, an individual location cell (e.g., data record) represents a location range relative to the microphone array, such as a portion of the environment. For example, a first location cell (e.g., first data record) may correspond to a first location range extending from a first azimuth (e.g., $aziMin_0$) to a second azimuth (e.g., $aziMax_0$), from a first elevation (e.g., $eleMin_0$) to a second elevation (e.g., $eleMax_0$), and from a first radius (e.g., $radMin_0$) to a second radius (e.g., $radMax_0$); a second location cell (e.g., second data record) may correspond to a second location range extending from the second azimuth (e.g., $aziMin_1$) to a third azimuth (e.g., $aziMax_1$), from the first elevation (e.g., $eleMin_1$) to the second elevation (e.g., $eleMax_1$), and from the first radius (e.g., $radMin_1$) to the second radius (e.g., $radMax_1$); and so on.

In the 3D location cell structure 330 illustrated in FIG. 3C, the distance range is divided into three radius intervals (e.g., numRadius=3) having non-uniform boundaries (e.g., rad={0, 0.8, 1.6, 3}). Thus, the first radius interval corresponds to a first radius range (e.g., $0 \le r \le 0.8$), the second radius interval corresponds to a second radius range (e.g., $0.8 < r \le 1.6$), and the third radius interval corresponds to a radius elevation range (e.g., $1.6 < r \le 3.0$), although the disclosure is not limited thereto. In some examples, the number of radius intervals and/or the radius interval boundaries may be determined based on the distribution of location vectors, as described in greater detail below with regard to FIG. 7.

In the example illustrated in FIG. 3C, two location cells are illustrated as 3D shapes, separate from the 3D location cell structure 330. For example, a first location cell (e.g., first data record) is illustrated as a first location range extending from a first azimuth (e.g., $\theta_1=180°$) to a second azimuth (e.g., $\theta_2=168.75°$), from a first elevation (e.g., $\phi_1=71°$) to a second elevation (e.g., $\phi_2=52°$), and from a first radius (e.g., $r_1=0.8$ m) to a second radius (e.g., $r_2=1.6$ m). Thus, the first location cell corresponds to a first azimuth range (e.g., $168.75° \le \theta \le 180°$), a first elevation range (e.g., $52° < \phi \le 71°$), and a first radius range (e.g., $0.8 < r \le 1.6$). Similarly, a second location cell (e.g., second data record) is illustrated as a second location range extending from the first azimuth (e.g., $\theta_1=180°$) to a third azimuth (e.g., $\theta_3=157.5°$), from a third elevation (e.g., $\phi_3=33°$) to a fourth elevation (e.g., $\phi_4=14°$), and from the first radius (e.g., $r_1=0.8$ m) to the second radius (e.g., $r_2=1.6$ m). Thus, the second location cell corresponds to a second azimuth range (e.g., $157.5° < \theta \le 180°$), a second elevation range (e.g., $14° < \phi \le 33°$), and the first radius range (e.g., $0.8 < r \le 1.6$).

To determine the average power values, the device 110 may determine location cell data that indicates the location vectors associated with each location cell. In some examples, the device 110 may determine the location vectors associated with a particular location cell and may store an indication of the specific location vectors and/or an association between the specific location vector and the location cell. However, the disclosure is not limited thereto, and in other examples the device 110 may determine the location vectors associated with a particular location cell and store an indication of (i) the TDOA index(es) associated with the location cell and (ii) a weight value corresponding to an amount of overlap between each TDOA index and the location cell. For example, the device 110 may generate location cell data that indicates a pair {index, weight} for each TDOA index associated with the location cell.

The TDOA index is used to address one vector inside the set of candidate location vectors, and the weight corresponds to a relative weight that the device 110 may apply to the power value associated with that TDOA index. As the TDOA index has a 1:1 correspondence to a clustered location vector, the device 110 may determine the clustered location vector(s) associated with the location cell and the exact number of candidate location vectors associated with each of the clustered location vector(s) without departing from the disclosure.

To illustrate an example, the device 110 may store information unique to a first location cell in a portion of the location cell data (e.g., dirIndexCount[i]) associated with the first location cell. During initialization, the device 110 may check each location vector with known location (e.g., {azimuth, elevation, radius}) to see whether it is inside the boundaries of a particular location cell. For example, if the location vector is inside the boundaries of the first location cell, the device 110 may determine a TDOA index (e.g., first index $TDOA_0$) associated with the location vector and determine whether the TDOA index is stored in the portion of the location cell data (e.g., dirIndexCount[i]). If the TDOA index is not stored in the portion of the location cell data (e.g., dirIndexCount[i] does not include first index $TDOA_0$), the device 110 may add the TDOA index with a count value of one (e.g., {TDOA0, 1}). If the TDOA index is already stored in the portion of the location cell data (e.g., dirIndexCount[i] includes $TDOA_0$), the device 110 may increment the count associated with the TDOA index (e.g., {TDOA0, 2}).

After performing an initialization process by repeating this operation for each of the location vectors and each of the location cells, the device 110 may generate location cell data that includes the pair {index, weight} for each TDOA index associated with each location cell of the plurality of location cells. In some examples, the device 110 may determine a total count value for each location cell by summing the respective count values for each of the TDOA indexes associated with the location cell. For example, if the first location cell is associated with four TDOA indexes, the device 110 may determine the total count value for the first location cell by summing the four count values associated with the four TDOA indexes. Using the total count value, the device 110 may determine weight values associated with each of the TDOA indexes. Thus, the weight values reflects a contribution of each individual TDOA index (e.g., location vector, delay vector, etc.) to the location cell. For example, a power of the location cell is given by the weighted sum of the powers of the original cells that overlap the location cell, with the weight proportional to the overlapping volume.

Using the location cell data, the device 110 may determine the average power value (e.g., weighted average) for the first location cell. For example, the device 110 may determine a first power value associated with a first TDOA index, may determine that the first TDOA index is associated with the first location cell, and may determine a first weight value corresponding to the first TDOA index (e.g., {index, weight} indicates first TDOA index and first weight value). To determine the average power value for the first location cell, the device 110 may multiply the first power value by the first weight value to determine a first product. Similarly, the device 110 may determine second TDOA indexes associated with the first location cell, multiply second power values for each of the second TDOA indexes with corresponding weight values to determine second products, and determine a sum of the first product and the second products to determine a total power value for the first location cell. Thus, the total power value corresponds to a weighted average of the TDOA indexes associated with the first location cell.

After defining the location cells (e.g., determining the location cell structure), the device 110 may determine neighboring location cells for each of the location cells, as the neighboring cells are required to determine power peak location(s), which occurs where a peak power level is highest among all of the neighboring location cells. Due to the way that the device 110 defined the location cell structure, the location cells are rectangular shaped with consistent boundaries between neighboring location cells. In some examples, the location cells have an azimuth width that is an integer multiple of top/bottom neighbors, which enables the device 110 to determine neighboring location cells. For example, if the neighboring location cells are at the same elevation (e.g., included in a single elevation interval), the device 110 may determine whether two location cells share the same left or right azimuth boundary. If the neighboring location cells are at different elevations (e.g., included in different elevation intervals), the device 110 may determine whether two location cells share the same top or bottom elevation boundary, and then determine whether the azimuth interval of one location cell is contained in the azimuth interval of a second location cell. However, this is intended to conceptually illustrate an example and the disclosure is not limited thereto.

Figure 4B:
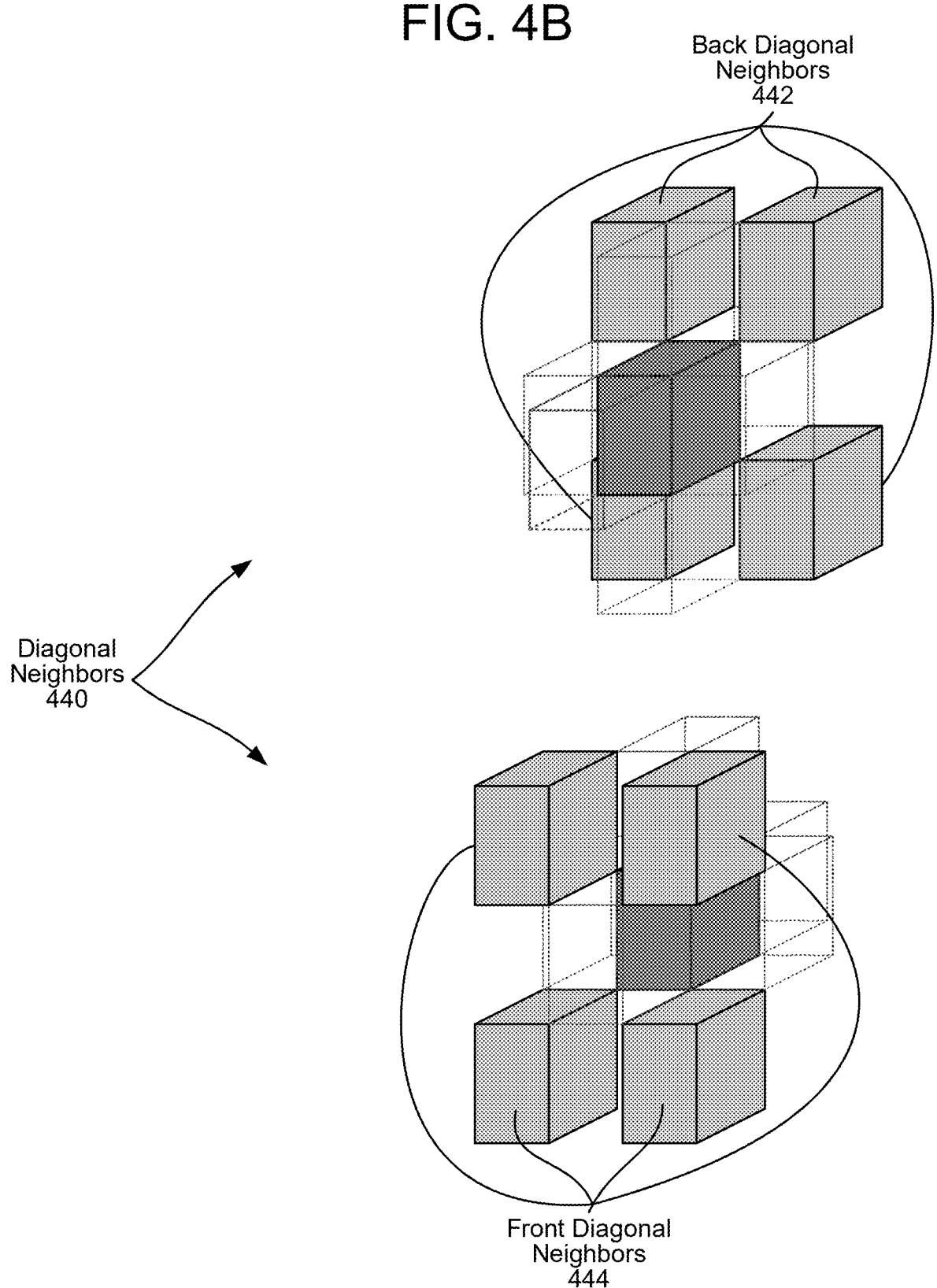

FIGS. 4A-4B illustrate examples of determining neighboring cells for each 3D location cell according to embodiments of the present disclosure. As described in greater detail above, one of the benefits of defining a set of 3D location cells having a regular structure is that the location cells have consistent boundaries with predetermined uniformity and/or symmetry. For example, the set of 3D location cells may include rectangular cells having boundaries that are orthogonal along a predefined grid, such that an individual location cell defines a location range corresponding to a 3D solid or prism. As the location cells have this regular structure, the device 110 may easily identify neighboring location cells for each location cell. For example, the device 110 may select a first location cell and determine a first set of neighboring location cells 400 that are adjacent to the first location cell, in proximity to the first location cell, share a common boundary with the first location cell, and/or the like.

As illustrated in FIG. 4A, the neighboring location cells 400 may include azimuth neighbors 410, elevation neighbors 420, and/or distance neighbors 430. Thus, if the first location cell corresponds to a first 3D location within the environment, each of the neighboring location cells 400 may correspond to another 3D location adjacent to the first 3D location. For example, one of the azimuth neighbors 410 may correspond to a second location cell adjacent to the first location cell in a first direction, one of the elevation neighbors 420 may correspond to a third location cell adjacent to the first location cell in a second direction perpendicular to the first direction, and one of the distance neighbors 430 may correspond to a fourth location cell adjacent to the first location cell in a third direction perpendicular to both the first direction and the second direction.

As illustrated in FIG. 4A, azimuth neighbors 410 correspond to neighbors along a first axis (e.g., azimuth axis) running left-to-right. Thus, the azimuth neighbors 410 for a selected location cell 405 may include a left neighbor 412 and a right neighbor 414. In some examples, the left neighbor 412, the selected location cell 405, and the right neighbor 414 may share the same radius interval and the same elevation interval and may only vary with regard to azimuth. However, the disclosure is not limited thereto, and in other examples the left neighbor 412 and/or the right neighbor 414 may have different radius boundaries and/or elevation boundaries from the selected location cell 405 without departing from the disclosure. For example, the selected location cell 405 may have two or more left neighbor cells and/or two or more right neighbor cells without departing from the disclosure.

In the example illustrated in FIG. 4A, an azimuth width associated with the left neighbor 412, the selected location cell 405, and the right neighbor 414 may be equal, such that the azimuth intervals are uniform within the elevation interval. Thus, while each elevation interval may have a different azimuth width corresponding to a number of azimuth intervals, the azimuth widths within an elevation interval may be consistent. However, the disclosure is not limited thereto and in some examples the azimuth width may vary within the elevation interval without departing from the disclosure.

As illustrated in FIG. 4A, elevation neighbors 420 correspond to neighbors along a second axis (e.g., elevation axis) running top-to-bottom. Thus, the elevation neighbors 420 for the selected location cell 405 may include a top neighbor 422 and a bottom neighbor 424. In some examples, the top neighbor 422, the selected location cell 405, and the bottom neighbor 424 may share the same radius interval and the same azimuth interval and may only vary with regard to elevation. However, the disclosure is not limited thereto, and in other examples the top neighbor 422 and/or the bottom neighbor 424 may have different radius boundaries and/or azimuth boundaries from the selected location cell 405 without departing from the disclosure. For example, the selected location cell 405 may have two or more top neighbor cells and/or two or more bottom neighbor cells without departing from the disclosure.

To illustrate an example, if the top elevation interval has a lower number of azimuth intervals, the selected location cell 405 may have a single top neighbor 422. However, if the bottom elevation interval has a higher number of azimuth intervals, the selected location cell 405 may have two or more bottom neighbors 424 without departing from the disclosure. For example, a first spacing of a first elevation range associated with the top neighbor 422 and a second spacing of a second elevation range associated with the selected location cell 405 may both correspond to a first azimuth value (e.g., 11.25°, which corresponds to 32 azimuth intervals). However, the disclosure is not limited thereto and the second spacing may correspond to the first azimuth value but the first spacing may correspond to a second azimuth value (e.g., 22.5°, which corresponds to 16 azimuth intervals) without departing from the disclosure.

In the example illustrated in FIG. 4A, an elevation range associated with the top neighbor 422, the selected location cell 405, and the bottom neighbor 424 may be equal. However, the disclosure is not limited thereto and the elevation ranges may vary without departing from the disclosure.

As illustrated in FIG. 4A, distance neighbors 430 correspond to neighbors along a third axis (e.g., radius axis) running front-to-back. Thus, the distance neighbors 430 for the selected location cell 405 may include a front neighbor 432 and a back neighbor 434. In some examples, the front neighbor 432, the selected location cell 405, and the back neighbor 434 may share the same azimuth interval and the same elevation interval and may only vary with regard to radius. However, the disclosure is not limited thereto, and in other examples the front neighbor 432 and/or the back neighbor 434 may have different azimuth boundaries and/or elevation boundaries from the selected location cell 405 without departing from the disclosure. For example, the selected location cell 405 may have two or more front neighbor cells and/or two or more back neighbor cells without departing from the disclosure.

In the example illustrated in FIG. 4A, a radius range (e.g., depth) associated with the front neighbor 432, the selected location cell 405, and the back neighbor 434 may be equal, such that the radius intervals are uniform within the elevation interval. However, the disclosure is not limited thereto and in some examples the depth may vary within the elevation interval without departing from the disclosure.

As illustrated in FIG. 4B, diagonal neighbors 440 correspond to neighbors that are offset in a diagonal direction from the selected location cell 405. In some examples, a diagonal direction may correspond to an offset of one unit (e.g., one interval) along all three axis, which can be represented as (+/−1, +/−1, +/−1). For example, using the dimensions of the selected location cell 405 as a reference unit, the diagonal neighbors 440 correspond to each combination of positive and negative offsets along the three axis. Thus, FIG. 4B illustrates examples of eight different diagonal neighbors 440, reflecting each of the unique combinations.

Referring to FIG. 4B, back diagonal neighbors 442 are illustrated as corresponding to the four combinations having a positive offset along the third axis (e.g., [+/−1, +/−1, 1]). For example, the back diagonal neighbors 442 include a top-right diagonal (e.g., [1,1,1]), a top-left diagonal (e.g., [−1,1,1]), a bottom-left diagonal (e.g., [−1,−1,1]), and a bottom-right diagonal (e.g., [1,−1,1]). In contrast, front diagonal neighbors 444 are illustrated as corresponding to the four combinations having a negative offset along the third axis (e.g., [+/−1, +/−1, −1]). For example, the front diagonal neighbors 444 include a top-right diagonal (e.g., [1,1,−1]), a top-left diagonal (e.g., [−1,1,−1]), a bottom-left diagonal (e.g., [−1,−1,−1]), and a bottom-right diagonal (e.g., [1,−1,−1]).

As described above, the selected location cell 405 and the diagonal neighbors 440 may share the same azimuth interval and the same elevation interval without departing from the disclosure. However, the disclosure is not limited thereto, and in other examples the diagonal neighbors 440 the selected location cell 405 and the diagonal neighbors 440 may share the same azimuth interval and the same elevation interval. As part of performing peak detection, the device 110 may use the diagonal neighbors 440 in addition to the azimuth neighbors 410, the elevation neighbors 420, and the distance neighbors 430. However, the disclosure is not limited thereto and in some examples the device 110 may perform peak detection without using the diagonal neighbors 440 without departing from the disclosure.

FIG. 5 illustrates examples of location cell data according to embodiments of the present disclosure. As illustrated in FIG. 5, in some examples the device 110 may store first location cell data 510 that includes a variety of information associated with the location cell without departing from the disclosure. For example, the first location cell data 510 may include azimuth boundaries (e.g., aziMin and aziMax), elevation boundaries (e.g., eleMin and eleMax), and/or radius boundaries (e.g., radMin and radMax) for each of the location cells.

As used herein, the azimuth boundaries, the elevation boundaries, and/or the radius (e.g., distance) boundaries may represent a location range associated with the location cell (e.g., data record). Thus, an individual location cell (e.g., data record) corresponds to a location range (e.g., three-dimensional space) relative to the microphone array, such as a small partition of the direction space (e.g., segment of the environment as viewed from the device 110) for a range of radius values (e.g., radius interval). For example, a first location cell (e.g., first data record) may correspond to a first location range extending from a first azimuth (e.g., $aziMin_0$) to a second azimuth (e.g., $aziMax_0$), from a first elevation (e.g., $eleMin_0$) to a second elevation (e.g., $eleMax_0$), and from a first radius (e.g., $radMin_0$) to a second radius (e.g., $radMax_0$); a second location cell (e.g., second data record) may correspond to a second location range extending from the second azimuth (e.g., $aziMin_1$) to a third azimuth (e.g., $aziMax_1$), from the first elevation (e.g., $eleMin_1$) to the second elevation (e.g., $eleMax_1$), and from the first radius (e.g., $radMin_1$) to the second radius (e.g., $radMax_1$); and so on.

Additionally or alternatively, the first location cell data 510 may include index(es) (e.g., index values) and weight(s) (e.g., weight values) for each TDOA index associated with the location cell. For example, the first location cell ("0") may include a first plurality of indexes and corresponding weights, the second location cell ("1") may include a second plurality of indexes and corresponding weights, and so on. As described above, the device 110 may determine the indexes and/or weights based on a plurality of candidate location vectors associated with each location cell.

In other examples, the device 110 may store second location cell data 520 that does not include the azimuth boundaries and the elevation boundaries associated with each location cell without departing from the disclosure. For example, the location cell structure may be known by the device 110 and second location cell data 520 may include the index(es) (e.g., index values) and weight(s) (e.g., weight values) for each TDOA index associated with the location cell without departing from the disclosure.

While the first location cell data 510 and the second location cell data 520 illustrate examples in which the device 110 stores the index(es) and the weight(s) separately, the disclosure is not limited thereto. Instead, the device 110 may store one or more pairs (e.g., {index, weight}) for each location cell, with each pair indicating a TDOA index and corresponding weight value associated with the location cell, as illustrated by example location cell 530.

As used herein, a plurality of location cells may be referred to as a plurality of data records (e.g., stored data) without departing from the disclosure. As illustrated in FIG. 3C, the 3D location cell structure 330 represents a visual illustration (e.g., graphical representation) of the plurality of location cells and corresponding location ranges. For example, the 3D location cell structure 330 partition the direction space using regular structure (e.g., predetermined uniformity and/or symmetry), dividing the azimuth range [−180° to 180°], the elevation range [0° to 90°], and the radius range [0 m to 3 m] into the plurality of location cells with corresponding location ranges illustrated relative to the overall direction space.

In contrast, the location cell data 510/520 depicted in FIG. 5 is a tabular representation of the location cells, with each parameter (e.g., boundary value, index value, weight value, etc.) associated with a location cell represented as an individual entry in a single data record. For example, each location cell is represented in the location cell data 510 by a corresponding data record, with a first entry indicating the location cell index (e.g., Location cell), a second entry indicating a minimum azimuth (e.g., aziMin), a third entry indicating a maximum azimuth (e.g., aziMax), a fourth entry indicating a minimum elevation (e.g., eleMin), a fifth entry indicating a maximum elevation (e.g., eleMax), a sixth entry indicating a minimum radius (e.g., radMin), a seventh entry indicating a maximum radius (e.g., radMax), an eighth entry indicating a TDOA index value (e.g., Index), and a ninth entry indicating a weight value (e.g., Weight), although the disclosure is not limited thereto. Thus, a plurality of data records represents all of the information associated with a plurality of location cells and there is a 1:1 correspondence between an individual data record and an individual location cell.

FIG. 6 illustrates an example of location cell data according to embodiments of the present disclosure. In some examples, the format of the delay-location codebook may be defined such that the codebook includes a first number of location vectors (e.g., TDOA data) and a second number of location cells (e.g., location cell data). For example, the first number of location vectors may correspond to a unique set of delay vectors, such that each delay vector corresponds to a single location vector, as described above with regard to determining the final delay-direction codebook. Similarly, the second number of location cells may correspond to each location cell defined by the delay-location codebook.

While not illustrated in FIG. 6, each of the first number of location vectors may be associated with seven different parameters (e.g., entries). For example, each location vector may be associated with a first parameter (e.g., x coordinate), a second parameter (e.g., y coordinate), a third parameter (e.g., z coordinate), a fourth parameter (e.g., radius), a fifth parameter (e.g., azimuth), a sixth parameter (e.g., elevation), and a seventh parameter (e.g., delay vector, such as TDOA [0, . . . , numMicPair−1]). Thus, the delay-location codebook may associate an individual delay vector with 3D coordinates associated with the 3D location vector, and may include both rectangular coordinates (e.g., [x,y,z]) and spherical coordinates (e.g., [radius, azimuth, elevation]). However, the disclosure is not limited thereto and the information associated with each location vector in the delay-direction codebook may vary without departing from the disclosure.

Similarly, the final delay-direction codebook may include entries for each of the second number of location cells. While this information may be represented in a number of different ways without departing from the disclosure, FIG. 6 conceptually illustrates a single example. For example, location cell data 610 illustrates information associated with a single location cell (e.g., DC(i)) from the second number of location cells.

As illustrated in FIG. 6, the location cell data 610 may include six different entries (e.g., rows) for a single location cell (e.g., DC(i)), and a single entry may include multiple parameters (e.g., columns), although the disclosure is not limited thereto. For example, the first entry corresponds to location information defining the location cell, the second entry corresponds to a number of 3D location vectors (e.g., m centroids) associated with the location cell, the third entry corresponds to an index representing the 3D location vectors (e.g., centroid index, represented as $[c_0, c_1, \ldots, c_{m-1}]$), the fourth entry corresponds to a relative weight associated with the 3D location vectors (e.g., centroid weight, represented as $[w_0, w_1, \ldots, w_{m-1}]$), the fifth entry corresponds to a number of neighboring location cells (e.g., n neighboring location cells), and the sixth entry corresponds to an index representing the neighboring location cells (e.g., neighbor index, represented as $[DC_0, DC_1, \ldots, DC_{m-1}]$).

As illustrated in FIG. 6, the first entry represents the location information using nine different parameters (e.g., columns), although the disclosure is not limited thereto. For example, the first column corresponds to a first parameter (e.g., aziMin $\theta_0$), the second column corresponds to a second parameter (e.g., aziMax $\theta_1$), the third column corresponds to a third parameter (e.g., eleMin $\phi_0$), the fourth column corresponds to a fourth parameter (e.g., eleMax $\theta_1$), the fifth column corresponds to a fifth parameter (e.g., radMin $r_0$), the sixth column corresponds to a sixth parameter (e.g., radMax $r_1$), the seventh column corresponds to a seventh parameter (e.g., aziCen $\theta_{0.5}$), the eighth column corresponds to an eighth parameter (e.g., eleCen $\theta_{0.5}$), and the ninth column corresponds to a ninth parameter (e.g., radCen $r_{0.5}$).

In some examples, the seventh parameter (e.g., aziCen $\theta_{0.5}$) represents an azimuth centroid of the location cell, which corresponds to an average of the first parameter (e.g., aziMin $\theta_0$) and the second parameter (e.g., aziMax $\theta_1$), the eighth parameter (e.g., eleCen $\theta_{0.5}$) represents an elevation centroid of the location cell, which corresponds to an average of the third parameter (e.g., eleMin $\phi_0$) and the fourth parameter (e.g., eleMax $\phi_1$), and the s ninth parameter (e.g., radCen $r_{0.5}$) represents a radius centroid of the location cell, which corresponds to an average of the fifth parameter (e.g., radMin $r_0$) and the sixth parameter (e.g., radMax $r_1$), although the disclosure is not limited thereto.

Figure 7:
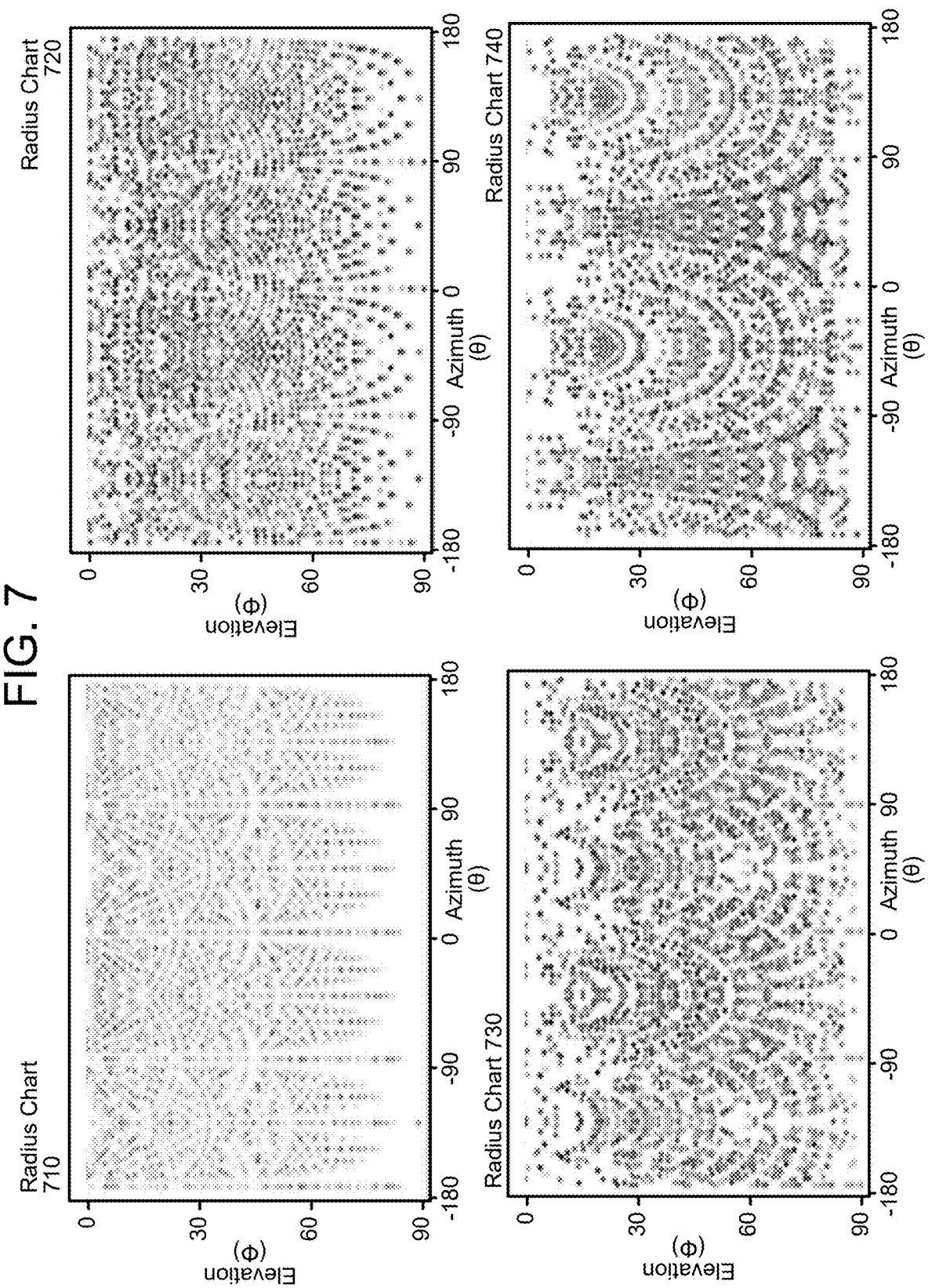
FIG. 7 illustrates examples of location vector distribution as a function of distance according to embodiments of the present disclosure.

FIG. 7 illustrates examples of location vector distribution as a function of distance according to embodiments of the present disclosure. In deriving the codebook, the system 100 may define the distance range based on a number of radius intervals (e.g., distance groupings) and/or radius boundaries (e.g., boundary between radius intervals) prior to determining a set of 3D location cells. For example, the system 100 may determine a first number of radius intervals and/or specific radius boundaries and then use these parameters to determine the set of 3D location cells. For ease of illustration, radius intervals and/or radius boundaries may be interchangeably referred to as distance intervals and/or distance boundaries without departing from the disclosure. In some examples, the system 100 may select the number of radius intervals and/or the radius boundaries such that each radius interval corresponds to a similar number of location vectors. For example, the system 100 may sort the radius centroid values associated with each of the location vectors, find the number of location vectors per interval based on a desired number of divisions (e.g., radius intervals), and then use the number of location vectors per interval to determine the exact radius boundaries (e.g., distance value separating the radius intervals). However, the disclosure is not limited thereto and the system 100 may determine the number of radius intervals and/or the radius boundaries using other techniques without departing from the disclosure.

In the 3D location cell structure 330 illustrated in FIG. 3C, the distance range is divided into three radius intervals (e.g., numRadius=3) having non-uniform boundaries (e.g., rad={0, 0.8, 1.6, 3}). Thus, the first radius interval corresponds to a first radius range (e.g., $0 \leq r \leq 0.8$), the second radius interval corresponds to a second radius range (e.g., $0.8 < r \leq 1.6$), and the third radius interval corresponds to a radius elevation range (e.g., $1.6 < r \leq 3.0$). This is intended to conceptually illustrate a single example and the disclosure is not limited thereto. In some examples, the number of radius intervals and/or the radius interval boundaries may be determined based on the distribution of location vectors.

To illustrate an example, FIG. 7 illustrates positions of location vectors at various radius intervals. For example, FIG. 7 illustrates a first radius chart 710 corresponding to a first radius interval (e.g., 0 m to 0.27 m), a second radius chart 720 corresponding to a second radius interval (e.g., 0.27 m to 0.36 m), a third radius chart 730 corresponding to a third radius interval (e.g., 0.85 m to 1.09 m), and a fourth radius chart 740 corresponding to a fourth radius interval (e.g., 1.09 m to 1.55 m). While FIG. 7 illustrates examples of four different radius intervals, this only represents a portion of the total number of radius intervals (e.g., 9-11) used in this example. Additionally or alternatively, both the total number of radius intervals and/or the number of location vectors within each radius interval may vary without departing from the disclosure.

As described above, the system 100 may select the number of radius intervals and/or the radius boundaries such that a total number of location vectors is roughly equal across the radius intervals. For example, the first radius chart 710, the second radius chart 720, the third radius chart 730, and the fourth radius chart 740 may include roughly the same number of location vectors. However, as illustrated in FIG. 7, the direction coverages are different at different radius intervals. For example, there is a lower number of location vectors at an elevation near the north pole (e.g., elevation approaching 0°) at a shorter radius interval, whereas there is a lower number of location vectors at an elevation near the equator (e.g., elevation approaching 90°) at a longer radius interval.

While not illustrated in FIG. 7, a subset of the location vectors may be associated with a centroid (e.g., 3D space in the environment) that is elongated, such that the location vector has a relatively large distance range (e.g., large depth). Thus, while some of the location vectors may have a relatively short distance range and fit within a single radius interval, other location vectors may have a relatively long distance range and span across two or more radius intervals, depending on the radius boundaries chosen by the system 100. As a result, the delay vector and corresponding power value may be assigned to multiple location cells occupying different radius intervals, thereby decreasing an accuracy of peak detection.

To improve an accuracy, in some examples the system 100 may eliminate (e.g., ignore) the subset of location vectors that span two or more radius intervals when determining the set of location cells and/or the radius boundaries. For example, the system 100 may determine that a radius boundary exists between a minimum radius value and a maximum radius value of a first location vector and may ignore the first location vector when determining the location cell data. In some examples, the system 100 may determine a subset of the location vectors (e.g., spatial cluster data) that satisfy a condition (e.g., do not span two or more radius intervals) and generate the location cell data using the subset of the location vectors.

In some examples, the system 100 may use an iterative process to determine the radius boundaries. In each step of the iteration (e.g., epoch), the system 100 may perform a search process for each radius interval to locate the radius boundary value that is associated with a lowest variance, where the variance is calculated from the number of location vectors within each radius interval. By minimizing this variance, the system 100 may determine radius boundaries that include a similar number of location vectors at each radius interval (e.g., distance interval), excluding the location vectors that span two or more radius intervals. For example, the system 100 may determine radius boundaries such that a first number of location vectors associated with a first radius interval (e.g., first distance range) is roughly equal to a second number of location vectors associated with a second radius interval (e.g., second distance range).

Over a series of iterations (e.g., epochs), the system 100 may determine final radius boundaries with which to determine the set of location cells. The number of radius intervals and/or the specific radius boundaries may depend a geometry of the microphone array, a configuration of the microphones within the microphone array, and/or the like without departing from the disclosure. Once the final radius boundaries are determined, the system 100 may determine the set of location cells and generate the codebook data and/or location cell data, as described above.

Figure 8:
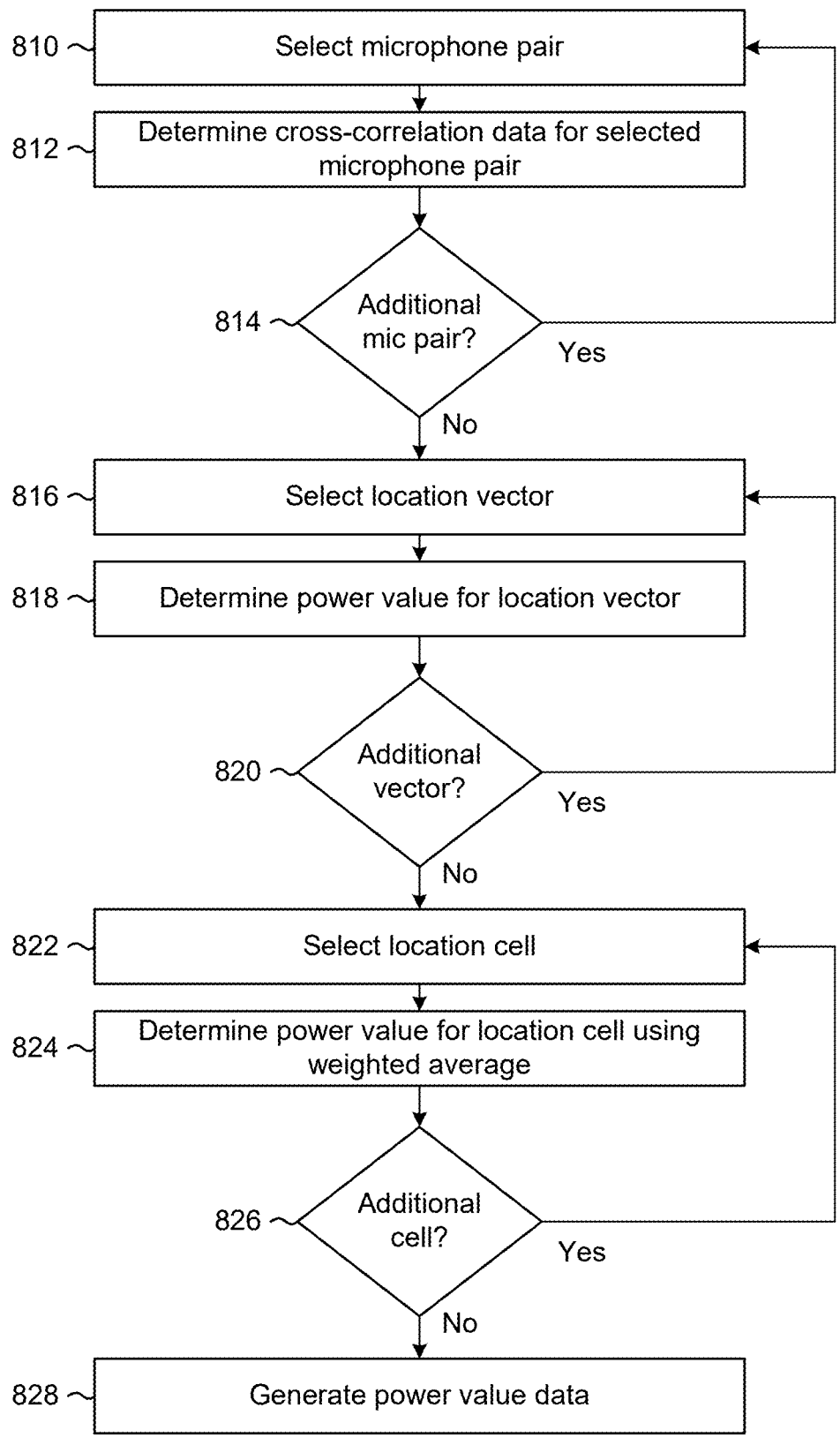
FIG. 8 is a flowchart illustrating an example method for generating power value data according to embodiments of the present disclosure.

FIG. 8 is a flowchart illustrating an example method for generating power value data according to embodiments of the present disclosure. As illustrated in FIG. 8, after generating audio data using the microphone array, the device 110 may select (810) a microphone pair and determine (812) cross-correlation data for the selected microphone pair. The device 110 may determine (814) whether there is an additional microphone pair and, if so, may loop to step 810 and repeat steps 810-812 to determine cross-correlation data for the additional microphone pair.

Once the device 110 has determined cross-correlation data for each microphone pair, the device 110 may select (816) a location vector and determine (818) a power value associated with the location vector. For example, the device 110 may determine a TDOA power value associated with the location vector. The device 110 may determine (820) whether there is an additional location vector and, if so, may loop to step 816 and repeat steps 816-818 to determine a power value for the additional location vector.

Once the device 110 has determined power values for each of the location vectors, the device 110 may select (822) a location cell (e.g., 3D location cell) from a plurality of location cells and may determine (824) a power value for the location cell using a weighted average. For example, the device 110 may use the location cell data 510/520/610 to determine that the first location cell is associated with first location vectors and first weight values. Based on that association, the device 110 may determine first power values corresponding to the first location vectors and may use the first power values and the first weight values to determine the power value. By multiplying each of the first power values by a corresponding weight value and summing the products, the device 110 determines a weighted average of the first power values.

The device 110 may determine (826) whether there is an additional location cell and, if so, may loop to step 822 and repeat steps 822-824 to determine a power value for the additional location cell. Once the device 110 has determined power values for each of the location cells in the plurality of location cells, the device 110 may generate (828) power value data that includes all of the power values associated with the location cells. For example, the power value data may include a weighted average power value for each location cell of the plurality of location cells.

For ease of illustration, the examples described above with regard to FIGS. 1 and 8 refer to determining weight values and calculating weighted average power values for each location cell. However, the disclosure is not limited thereto and the system 100 may determine the power value data using other techniques without departing from the disclosure.

Figure 9:
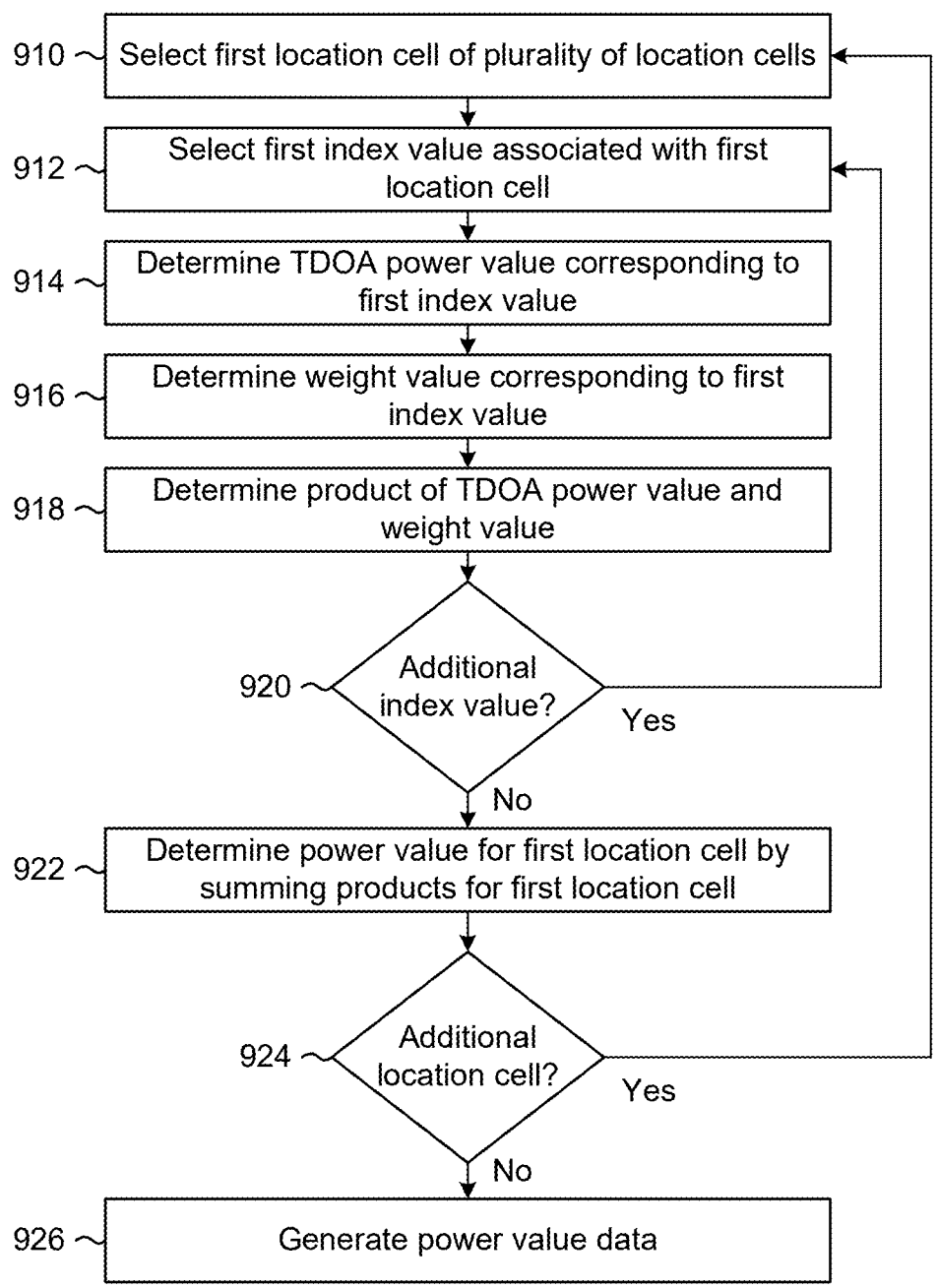
FIG. 9 is a flowchart illustrating an example method for generating average power value data according to embodiments of the present disclosure.

FIG. 9 is a flowchart illustrating an example method for generating power value data according to embodiments of the present disclosure. As illustrated in FIG. 9, the device 110 may select (910) a first location cell of a plurality of location cells and may select (912) a first index value associated with the first location cell. Using the first index value, the device 110 may determine (914) a TDOA power value corresponding to the first index value, may determine (916) a weight value corresponding to the first index value, and may determine (918) a product of the TDOA power value and the weight value.

The device 110 may determine (920) if there is an additional index value associated with the first location cell and, if so, may loop to step 912 and repeat steps 912-918 for the additional index value. If there is not an additional index value, the device 110 may determine (922) a power value for the first location cell by determining a sum of products for the first location cell. For example, if the first location cell is associated with m index values (e.g., m location vectors or centroids), the device 110 may determine the power value by summing the m products (e.g., Power=$c_0 \cdot w_0 + c_1 \cdot w_1 + \ldots + c_{m-1} \cdot w_{m-1}$).

The device 110 may determine (924) whether there is an additional location cell and, if so, may loop to step 910 and repeat steps 910-922 for the additional location cell. If there is not an additional location cell, the device 110 may generate (926) power value data using the power values calculated in step 922 for each of the location cells. As described above, while FIG. 9 illustrates an example in which the device 110 determines weight values and calculates a weighted average power value for each location cell, the disclosure is not limited thereto and the system 100 may determine the power value data using other techniques without departing from the disclosure.

Figure 10:
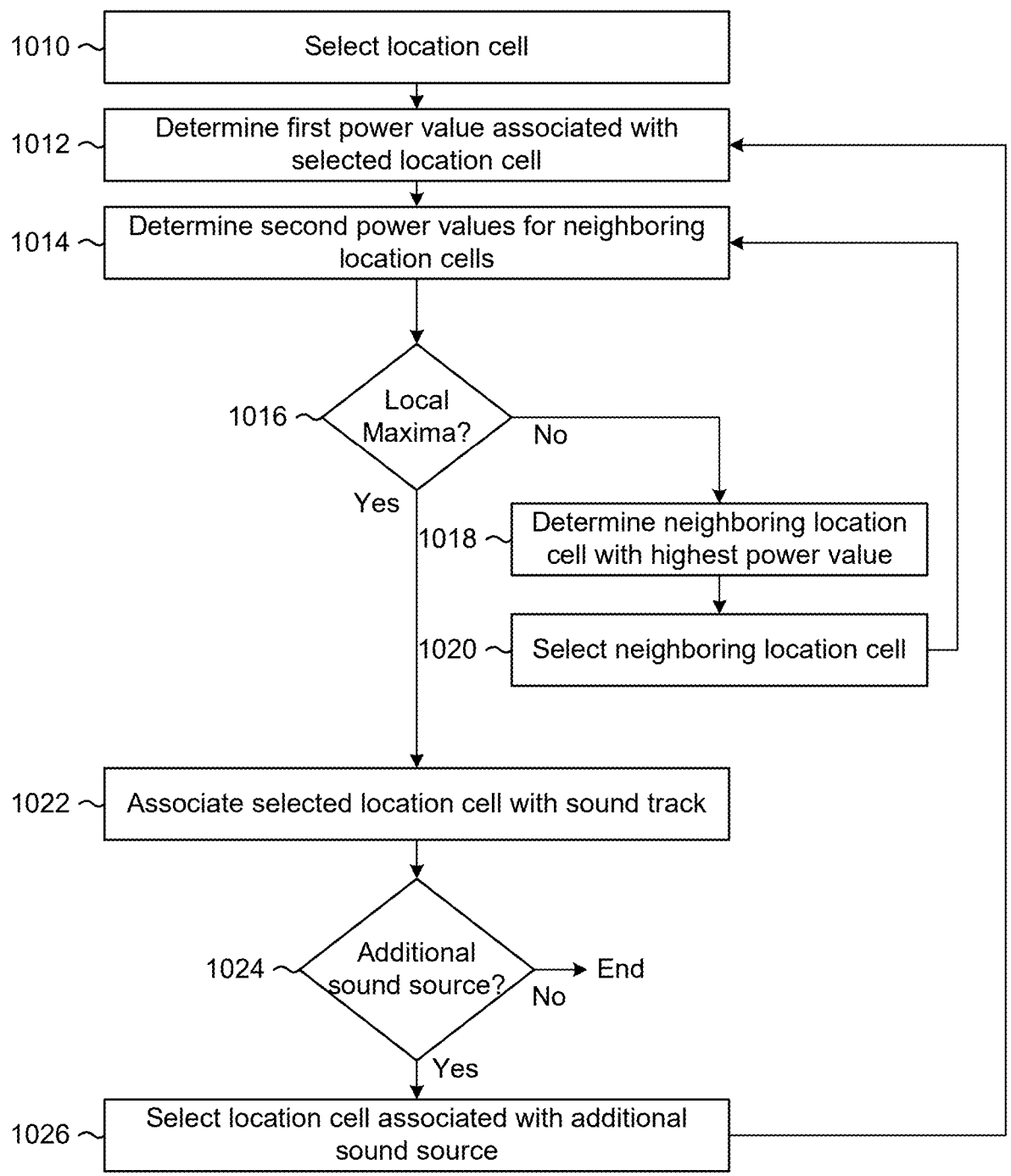
FIG. 10 is a flowchart illustrating an example method for performing sound source localization according to embodiments of the present disclosure.

FIG. 10 is a flowchart illustrating an example method for performing sound source localization according to embodiments of the present disclosure. As illustrated in FIG. 10, the device 110 may select (1010) a location cell from the plurality of location cells and may determine (1012) a first power value associated with the selected location cell. For example, the device 110 may calculate the first power value using the techniques described in greater detail above with regard to FIGS. 8-9. However, the disclosure is not limited thereto, and in some examples the device 110 may retrieve the first power value associated with the selected location cell from previously calculated power value data without departing from the disclosure.

Using the codebook data, the device 110 may determine (1014) second power values for neighboring location cells and determine (1016) whether the first power value associated with the selected location cell corresponds to a local maxima. For example, the device 110 may use the codebook data to identify neighboring location cells associated with the selected location cell and may determine/retrieve the second power values corresponding to each of these neighboring location cells. If any of the second power values exceed the first power value, the first power value is not a local maxima and therefore does not correspond to a sound source. If the first power value is not a local maxima, the device 110 may determine (1018) a neighboring location cell with a highest power value of the second power values, may select (1020) the neighboring location cell, and may loop to step 1014 and repeat steps 1014-1016 for the currently selected location cell.

The device 110 performs peak detection by iteratively performing steps 1014-1020 until eventually the first power value associated with a selected location cell corresponds to a local maxima. For example, the device 110 may incrementally select neighboring location cells in a direction towards a peak power value until determining that the first power value associated with the currently selected location cell exceeds all of the second power values associated with neighboring location cells, which indicates that the first power value corresponds to the peak power value.

When the first power value corresponds to a local maxima (e.g., peak power value for a cluster of power values), the device 110 may associate (1022) the selected location cell with a sound track corresponding to a sound source. For example, the device 110 may maintain a sound track for each sound source detected in the audio data and may update the sound track with a current estimated location associated with the selected location cell. In some examples, the current estimated location is in proximity to a previously estimated location, with clear separation between each of the sound sources, enabling the device 110 to associate the current estimated location with an existing sound track. For example, the device 110 may determine that only one existing sound track corresponds to the current estimated location and may update the existing sound track accordingly. Additionally or alternatively, the device 110 may use additional inputs (e.g., sensor data) to associate the current estimated location with an existing sound track. For example, the device 110 may detect a user device associated with a user, may use computer vision to detect an object/user at the current estimated location, and/or the like without departing from the disclosure.

As described above, in other examples the device 110 may be unable to associate the current estimated location with an existing sound track and may generate a new sound track instead. For example, if the current estimated location is not in proximity to previously estimated locations for any of the sound tracks (e.g., a location of the sound source changes while the sound source is inactive), if there is not clear separation between two or more sound sources (e.g., the sound source moves near another sound source and the device 110 is unable to distinguish between the two), some form of interference prevents the device 110 from continuously tracking the location of the sound source over time, and/or the like, the device 110 may generate the new sound track instead of associating the current estimated location with an existing sound track. When this occurs, two or more sound tracks may correspond to a single sound source without departing from the disclosure.

After associating the selected location cell with a sound track, the device 110 may determine (1024) whether an additional sound source is detected in the audio data. For example, the device 110 may detect a second sound source by determining that a second peak is represented in the power values (e.g., second cluster of power values). If an additional sound source is not detected, which indicates that each local maxima has been associated with a corresponding sound track, the process may end. However, if an additional sound source is detected, the device 110 may select (1026) a location cell associated with the additional sound source and may loop to step 1012 and repeat steps 1012-1022 for an additional local maxima. For example, the device 110 may detect a second cluster of power values and may select a location cell within the second cluster in step 1026, although the disclosure is not limited thereto.

Figure 11A:
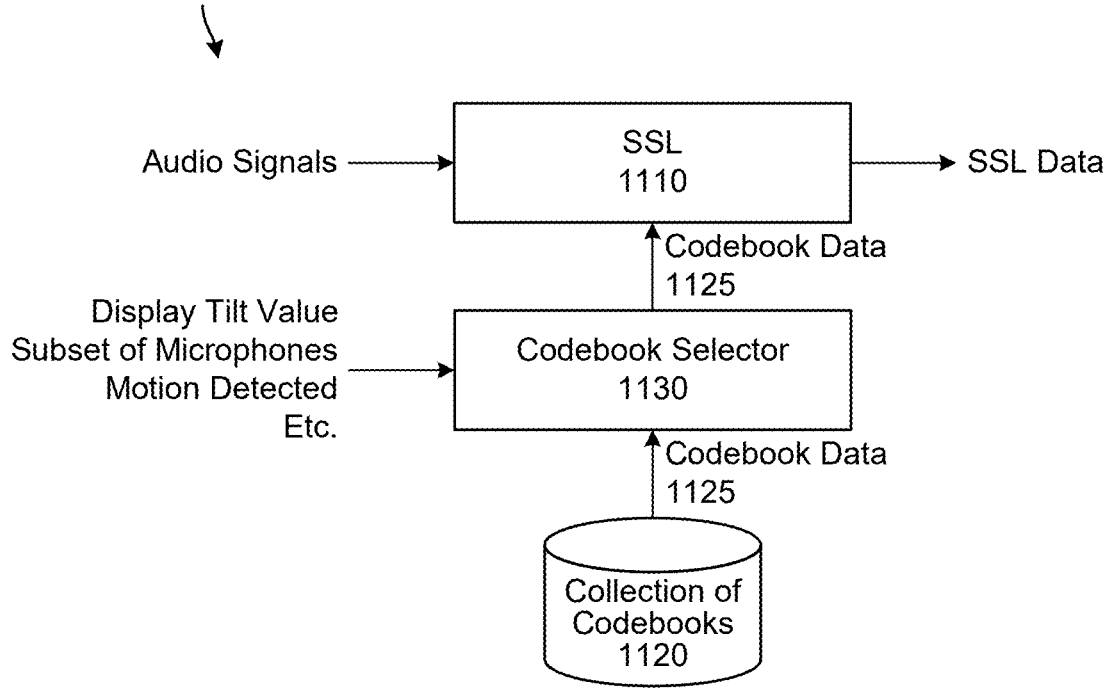
Figure 11B:
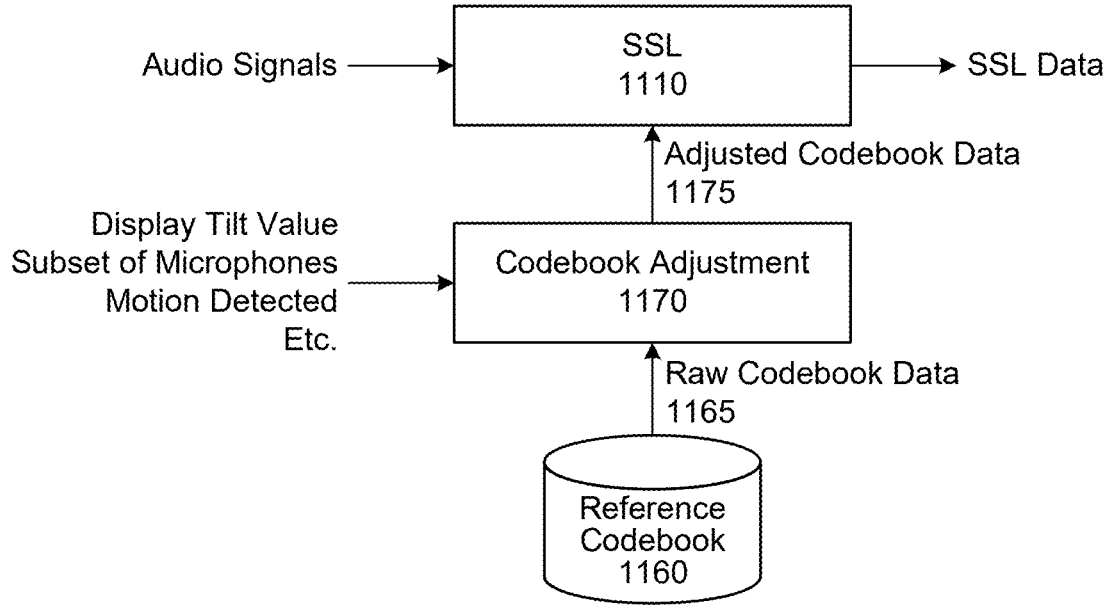

FIGS. 11A-11C are flowcharts illustrating example methods for dynamically selecting and/or adjusting delay-direction codebooks according to embodiments of the present disclosure. As illustrated in FIG. 11A, in some examples the device 110 may perform codebook selection 1100 to select a codebook from multiple codebooks. For example, the device 110 may include a collection of codebooks 1120 and a codebook selector 1130 configured to select codebook data 1125 from the collection of codebooks 1120. As illustrated in FIG. 11A, the codebook selector 1130 may select based on a display tilt value, a subset of microphones, motion detected, a height of an extendable arm and/or camera, and/or the like, although the disclosure is not limited thereto. For example, the device 110 may select a codebook based on any change to an orientation and/or shape of the device 110 that modifies the acoustics without departing from the disclosure. A sound source localization (SSL) component may receive audio signals and use the codebook data 1125 selected by the codebook selector 1130 to generate SSL data.

As illustrated in FIG. 11B, in other examples the device 110 may perform codebook adjustment 1150 to adjust a reference codebook based on an input. For example, the device 110 may include a reference codebook 1160 and a codebook adjustment component 1170. The codebook adjustment component 1170 may be configured to receive raw codebook data 1165 from the reference codebook 1160 and perform an adjustment to generate adjusted codebook data 1175. The codebook adjustment component 1170 may perform the adjustment based on input data, such as a display tilt value, a subset of microphones, motion detected, a height of an extendable arm and/or camera, and/or the like, although the disclosure is not limited thereto. For example, the device 110 may perform the adjustment based on any change to an orientation and/or shape of the device 110 that modifies the acoustics without departing from the disclosure. The SSL component 1110 may receive the audio signals and use the adjusted codebook data 1175 to generate the SSL data.

As illustrated in FIG. 11C, in some examples the device 110 may perform hybrid codebook generation 1180 to select a reference codebook and perform adjustments based on an input. For example, a codebook generator 1190 may include the collection of codebooks 1120, the codebook selector 1130, and the codebook adjustment component 1170. Thus, depending on the inputs, the codebook selector 1130 may be configured to select codebook data 1125 from the collection of codebooks 1120 and the codebook adjustment component 1170 may be configured to perform an adjustment to the codebook data 1125 to generate adjusted codebook data 1195. The SSL component 1110 may receive the audio signals and use the adjusted codebook data 1195 to generate the SSL data.

To illustrate an example using the tilt angles described above, the device 110 may be configured to tilt a display of the device 110 from a first tilt angle (e.g., screen vertical, or 0°) to a second tilt angle (e.g., 65°), although the disclosure is not limited thereto. If the microphone array is fixed to the display of the device 110, then tilting the display also tilts the microphone array, which may cause sound source localization (SSL) processing to not be accurate. For example, a first delay-direction codebook derived at a given tilt angle may be partially or completely invalid at another tilt angle.

To improve SSL processing, the device 110 may determine a tilt of the display (e.g., tilt angle) and may use this tilt angle to generate codebook data with which to perform SSL processing. In the codebook selection 1100 example illustrated in FIG. 11A, the device 110 may include a collection of codebooks 1120, with each codebook derived from a particular tilt angle. For example, the collection of codebooks 1120 may include six separate codebooks corresponding to 10° increments in the tilt angle. Thus, the device 110 may determine the tilt angle associated with the display and select the closest codebook to use to perform SSL processing.

In the codebook adjustment 1150 example illustrated in FIG. 11B, instead of including multiple codebooks, the device 110 may include a single reference codebook and may adjust the codebook based on the tilt angle. In some examples, the reference codebook 1160 may be derived at a reference tilt angle, and the device 110 may (a) determine an elevation difference between (i) a current tilt angle associated with the display and (ii) the reference tilt angle, and (b) adjust the reference codebook 1160 based on the difference. For example, the device 110 may adjust the reference codebook 1160 by rotating its location vectors based on the elevation difference. The device 110 may then use the adjusted codebook data 1175 to perform SSL processing.

One way to adjust the codebook is by multiplying each three-dimensional (3D) location vector (e.g., $u^T=[x, y, z]$) with a 3×3 rotation matrix of form:

$$J_y(\theta) = \begin{bmatrix} \cos\theta & 0 & \sin\theta \\ 0 & 1 & 0 \\ -\sin\theta & 0 & \cos\theta \end{bmatrix} \quad [11]$$

where θ denotes the delta angle, and the rotated location vector is another 3D vector given by J·u, although the disclosure is not limited thereto.

While the examples above refer to the device 110 selecting and/or adjusting the codebook based on a tilt of the display (e.g., tilt angle), the disclosure is not limited thereto. For example, the device 110 may select and/or adjust the codebook based on a height of an extendable arm, a height of an extendable camera, other structural changes to the device 110, and/or the like. Thus, the device 110 may select and/or adjust a codebook based on any change to an orientation and/or shape of the device 110 that modifies the acoustics without departing from the disclosure.

Figure 12:
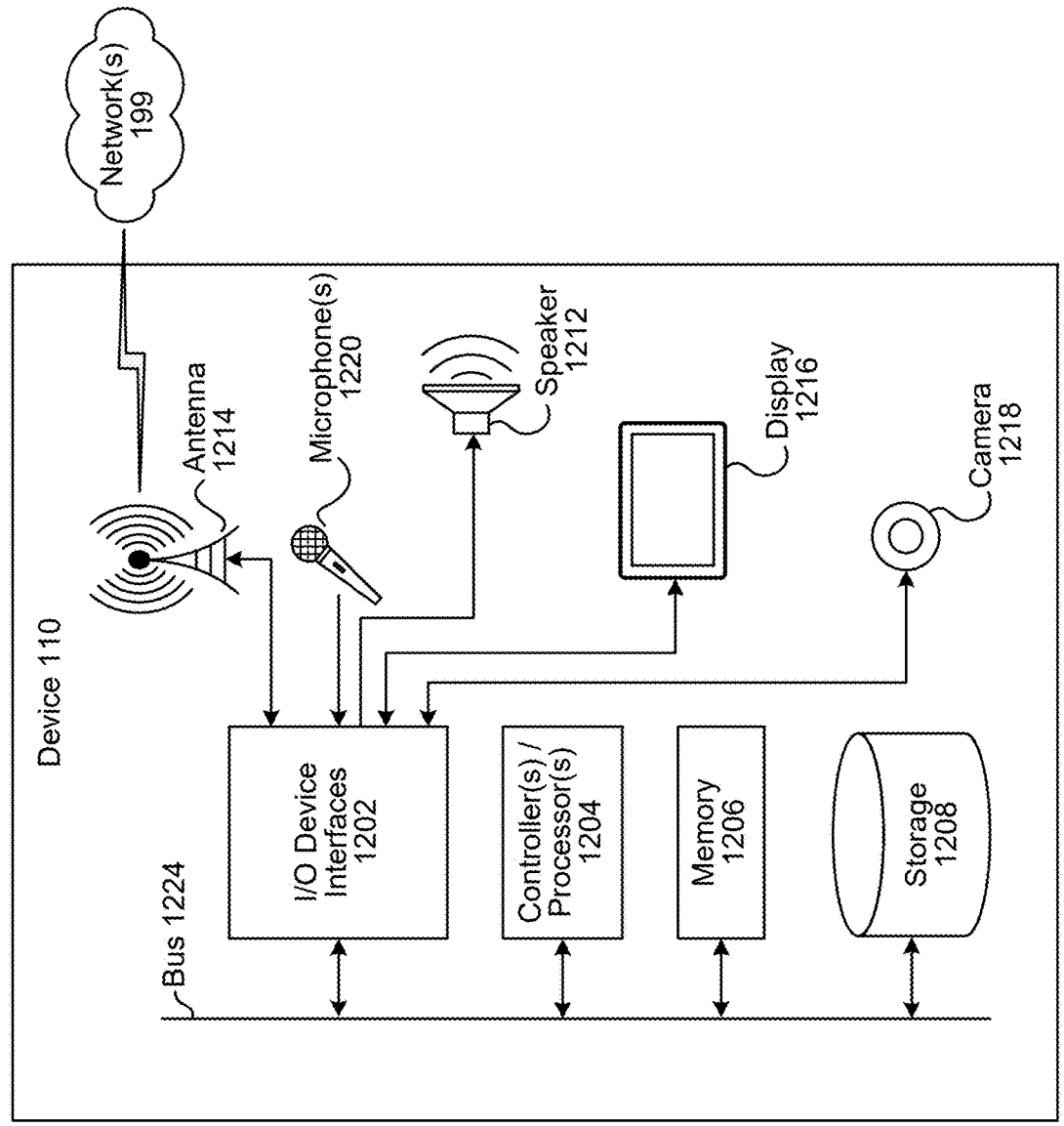
FIG. 12 is a block diagram conceptually illustrating example components of a device according to embodiments of the present disclosure.

FIG. 12 is a block diagram conceptually illustrating a device 110 that may be used with the system. FIG. 13 is a block diagram conceptually illustrating example components of system component(s) 120 according to embodiments of the present disclosure. The system component(s) 120 may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The system component(s) 120 may be configured to operate using one or more of a client-server model, a computer bureau model, grid computing techniques, fog computing techniques, mainframe techniques, utility computing techniques, a peer-to-peer model, sandbox techniques, or other computing techniques.

Each of these devices (110/120) may include one or more controllers/processors (1204/1304), which may each include a central processing unit (CPU) for processing data and computer-readable instructions, and a memory (1206/1306) for storing data and instructions of the respective device. The memories (1206/1306) may individually include volatile random access memory (RAM), non-volatile read only memory (ROM), non-volatile magnetoresistive memory (MRAM), and/or other types of memory. Each device (110/120) may also include a data storage component (1208/1308) for storing data and controller/processor-executable instructions. Each data storage component (1208/1308) may individually include one or more non-volatile storage types such as magnetic storage, optical storage, solid-state storage, etc. Each device (110/120) may also be connected to removable or external non-volatile memory and/or storage (such as a removable memory card, memory key drive, networked storage, etc.) through respective input/output device interfaces (1202/1302).

Computer instructions for operating each device (110/120) and its various components may be executed by the respective device's controller(s)/processor(s) (1204/1304), using the memory (1206/1306) as temporary "working" storage at runtime. A device's computer instructions may be stored in a non-transitory manner in non-volatile memory (1206/1306), storage (1208/1308), or an external device(s). Alternatively, some or all of the executable instructions may be embedded in hardware or firmware on the respective device in addition to or instead of software.

Each device (110/120) includes input/output device interfaces (1202/1302). A variety of components may be connected through the input/output device interfaces (1202/1302), as will be discussed further below. Additionally, each device (110/120) may include an address/data bus (1224/1324) for conveying data among components of the respective device. Each component within a device (110/120) may also be directly connected to other components in addition to (or instead of) being connected to other components across the bus (1224/1324).

Referring to FIG. 12, the device 110 may include input/output device interfaces 1202 that connect to a variety of components such as an audio output component such as a speaker 1212, a wired headset or a wireless headset (not illustrated), or other component capable of outputting audio. The device 110 may also include an audio capture component. The audio capture component may be, for example, a microphone 1220 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 1216 for displaying content and/or a camera 1218 to capture image data, although the disclosure is not limited thereto.

Via antenna(s) 1214, the input/output device interfaces 1202 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (1202/1302) may also include communication components that allow data to be exchanged between devices such as different physical servers in a collection of servers or other components.

The components of the device(s) (110/120) may include their own dedicated processors, memory, and/or storage. Alternatively, one or more of the components of the device(s) (110/120) may utilize the I/O interfaces (1202/1302), processor(s) (1204/1304), memory (1206/1306), and/or storage (1208/1308) of the device(s) (110/120).

As noted above, multiple devices may be employed in a single system. In such a multi-device system, each of the devices may include different components for performing different aspects of the system's processing. The multiple devices may include overlapping components. The components of the device(s) (110/120), as described herein, are illustrative, and may be located as a stand-alone device or may be included, in whole or in part, as a component of a larger device or system.

As illustrated in FIG. 14, multiple devices (110*a*-110*e*, 120) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device with display 110*a*, a speech-detection device 110*b*, an input/output (I/O) limited device 110*c* (e.g., a device such as a FireTV stick or the like), a display/smart television 110*d*, a motile device 110*e*, and/or the like may be connected to the network(s) 199 through a wireless service provider, over a WiFi or cellular network connection, or the like. Other devices are included as network-connected support devices, such as system component(s) 120 and/or others. The support devices may connect to the network(s) 199 through a wired connection or wireless connection.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, the method comprising:

generating audio data using a microphone array;

determining, using the audio data, first delay vector data associated with first three-dimensional (3D) coordinates relative to the microphone array, the first 3D coordinates corresponding to a first distance value;

determining, using the audio data, a first power value corresponding to the first delay vector data;

determining, using the audio data, second delay vector data associated with second 3D coordinates relative to the microphone array, the second 3D coordinates corresponding to a second distance value that is different than the first distance value;

determining, using the audio data, a second power value corresponding to the second delay vector data;

determining, using a first data record of a plurality of data records, a first product of the first power value and a first value, wherein the first value indicates a relative weight associated with the first delay vector data for a first 3D location cell;

determining, using the first data record, a second product of the second power value and a second value, the second value indicating a relative weight associated with the second delay vector data for the first 3D location cell; and determining, using the first product and the second product, a third power value associated with the first 3D location cell.

2. The computer-implemented method of claim 1, wherein the microphone array includes a first, a second, and a third microphone, and wherein determining the first delay vector data further comprises:

determining a first time delay between receipt, by the first microphone, of audio outputted by a first sound source and receipt of the audio by the second microphone; and determining a second time delay between receipt of the audio by the first microphone and receipt of the audio by the third microphone, wherein the first delay vector data includes the first time delay and the second time delay.

3. The computer-implemented method of claim 1, further comprising:

determining, using the first data record, a second data record of the plurality of data records, wherein the second data record represents a second 3D location cell adjacent to the first 3D location cell;

determining a fourth power value associated with the second 3D location cell;

determining that the third power value is higher than the fourth power value; and associating the first 3D location cell with a first sound source.

4. The computer-implemented method of claim 1, further comprising:

determining, using the first data record, a second data record of the plurality of data records, wherein the second data record represents a second 3D location cell diagonal to the first 3D location cell;

determining a fourth power value associated with the second 3D location cell;

determining that the third power value is higher than the fourth power value; and associating the first 3D location cell with a first sound source.

5. The computer-implemented method of claim 1, further comprising:
  determining, using the first data record, a second data record of the plurality of data records, wherein the second data record represents a second 3D location cell adjacent to the first 3D location cell;
  determining a fourth power value associated with the second 3D location cell;
  determining that the fourth power value is higher than the third power value;
  determining, using the second data record, a third data record of the plurality of data records, wherein the third data record represents a third 3D location cell adjacent to the second 3D location cell;
  determining a fifth power value associated with the third 3D location cell;
  determining that the fourth power value is higher than the fifth power value; and
  associating the second 3D location cell with a first sound source.

6. The computer-implemented method of claim 1, further comprising:
  determining, using the first data record, a subset of the plurality of data records, the subset of the plurality of data records corresponding to:
    a second 3D location cell adjacent to the first 3D location cell in a first direction,
    a third 3D location cell adjacent to the first 3D location cell in a second direction perpendicular to the first direction, and
    a fourth 3D location cell adjacent to the first 3D location cell in a third direction perpendicular to both the first direction and the second direction;
  determining, using the subset of the plurality of data records, a plurality of power values;
  determining that the third power value is higher than each of the plurality of power values; and
  associating the first 3D location cell with a first sound source.

7. The computer-implemented method of claim 1, wherein the plurality of data records represent an environment using 3D location cells having perpendicular boundaries, and the first 3D location cell extends from a first azimuth value to a second azimuth value, from a first elevation value to a second elevation value, and from a third distance value to a fourth distance value.

8. The computer-implemented method of claim 1, wherein the plurality of data records includes:
  a first number of data records corresponding to a first elevation range, the first number of data records having a first spacing corresponding to a first azimuth value; and
  a second number of data records corresponding to a second elevation range that is different from the first elevation range, the second number of data records having a second spacing corresponding to a second azimuth value that is different from the first azimuth value.

9. The computer-implemented method of claim 1, further comprising:
  generating a plurality of location vectors;
  determining a Euclidean distance between a first location associated with a first microphone and a second location associated with a second microphone;
  determining, using the Euclidean distance and a speed of sound, a first time delay between the first microphone and the second microphone; and
  determining, using the first time delay and the plurality of location vectors, a plurality of delay vectors including the first delay vector data.

10. The computer-implemented method of claim 3, further comprising:
  generating a plurality of location vectors;
  generating, using the plurality of location vectors, spatial cluster data including a first cluster associated with the first delay vector data;
  determining, using one or more distance boundaries, a subset of the spatial cluster data that satisfy a condition; and
  determining, using the subset of the spatial cluster data, the plurality of data records.

11. The computer-implemented method of claim 1, further comprising:
  generating a plurality of location vectors;
  determining a first number of distance intervals;
  determining, using the first number of distance intervals, a first distance range and a second distance range, wherein a first number of location vectors associated with the first distance range is equal to a second number of location vectors associated with the second distance range; and
  determining the plurality of data records using the first number of distance intervals, the first distance range, and the second distance range.

12. A system comprising:
  at least one processor; and
  memory including instructions operable to be executed by the at least one processor to cause the system to:
    generate audio data using a microphone array;
    determine, using the audio data, first delay vector data associated with first three-dimensional (3D) coordinates relative to the microphone array, the first 3D coordinates corresponding to a first distance value;
    determine, using the audio data, a first power value corresponding to the first delay vector data;
    determine, using the audio data, second delay vector data associated with second 3D coordinates relative to the microphone array, the second 3D coordinates corresponding to a second distance value that is different than the first distance value;
    determine, using the audio data, a second power value corresponding to the second delay vector data;
    determine, using a first data record of a plurality of data records, a first product of the first power value and a first value, wherein the first value indicates a relative weight associated with the first delay vector data for a first 3D location cell;
    determine, using the first data record, a second product of the second power value and a second value, the second value indicating a relative weight associated with the second delay vector data for the first 3D location cell; and
    determine, using the first product and the second product, a third power value associated with the first 3D location cell.

13. The system of claim 12, wherein the microphone array includes a first microphone, a second microphone, and a third microphone, and wherein the memory further comprises instructions that, when executed by the at least one processor, further cause the system to:
  determine a first time delay between receipt, by the first microphone, of audio outputted by a first sound source and receipt of the audio by the second microphone; and determine a second time delay between receipt of the audio by the first microphone and receipt of the audio by the third microphone,
wherein the first delay vector data includes the first time delay and the second time delay.

14. The system of claim 12, wherein the memory further comprises instructions that, when executed by the at least one processor, further cause the system to:
    determine, using the first data record, a second data record of the plurality of data records, wherein the second data record represents a second 3D location cell adjacent to the first 3D location cell;
    determine a fourth power value associated with the second 3D location cell;
    determine that the third power value is higher than the fourth power value; and
    associate the first 3D location cell with a first sound source.

15. The system of claim 12, wherein the memory further comprises instructions that, when executed by the at least one processor, further cause the system to:
    determine, using the first data record, a second data record of the plurality of data records, wherein the second data record represents a second 3D location cell diagonal to the first 3D location cell;
    determine a fourth power value associated with the second 3D location cell;
    determine that the third power value is higher than the fourth power value; and
    associate the first 3D location cell with a first sound source.

16. The system of claim 12, wherein the memory further comprises instructions that, when executed by the at least one processor, further cause the system to:
    determine, using the first data record, a second data record of the plurality of data records, wherein the second data record represents a second 3D location cell adjacent to the first 3D location cell;
    determine a fourth power value associated with the second 3D location cell;
    determine that the fourth power value is higher than the third power value;
    determine, using the second data record, a third data record of the plurality of data records, wherein the third data record represents a third 3D location cell adjacent to the second 3D location cell;
    determine a fifth power value associated with the third 3D location cell;
    determine that the fourth power value is higher than the fifth power value; and
    associate the second 3D location cell with a first sound source.

17. The system of claim 13, wherein the memory further comprises instructions that, when executed by the at least one processor, further cause the system to:
    determine, using the first data record, a subset of the plurality of data records, the subset of the plurality of data records corresponding to:
        a second 3D location cell adjacent to the first 3D location cell in a first direction,
        a third 3D location cell adjacent to the first 3D location cell in a second direction perpendicular to the first direction, and
        a fourth 3D location cell adjacent to the first 3D location cell in a third direction perpendicular to both the first direction and the second direction;
    determine, using the subset of the plurality of data records, a plurality of power values;
    determine that the third power value is higher than each of the plurality of power values; and
    associate the first 3D location cell with a first sound source.

18. The system of claim 13, wherein the plurality of data records represent an environment using 3D location cells having perpendicular boundaries, and the first 3D location cell extends from a first azimuth value to a second azimuth value, from a first elevation value to a second elevation value, and from a third distance value to a fourth distance value.

19. The system of claim 13, wherein the plurality of data records includes:
    a first number of data records corresponding to a first elevation range, the first number of data records having a first spacing corresponding to a first azimuth value; and
    a second number of data records corresponding to a second elevation range that is different from the first elevation range, the second number of data records having a second spacing corresponding to a second azimuth value that is different from the first azimuth value.

20. The system of claim 13, wherein the memory further comprises instructions that, when executed by the at least one processor, further cause the system to:
    generate a plurality of location vectors;
    generate, using the plurality of location vectors, spatial cluster data including a first cluster associated with the first delay vector data;
    determine, using one or more distance boundaries, a subset of the spatial cluster data that satisfy a condition; and
    determine, using the subset of the spatial cluster data, the plurality of data records.

* * * * *